United States Patent
Sakurai et al.

(10) Patent No.: US 9,817,285 B2
(45) Date of Patent: Nov. 14, 2017

(54) LIQUID CRYSTAL PANEL AND PIXEL STRUCTURE THEREOF

(71) Applicant: Japan Display Inc., Tokyo (JP)

(72) Inventors: Yoshihiro Sakurai, Kanagawa (JP); Hironao Tanaka, Kanagawa (JP); Hidemasa Yamaguchi, Kanagawa (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/161,777

(22) Filed: May 23, 2016

(65) Prior Publication Data

US 2016/0266455 A1    Sep. 15, 2016

Related U.S. Application Data

(63) Continuation of application No. 12/642,346, filed on Dec. 18, 2009, now Pat. No. 9,366,903.

(30) Foreign Application Priority Data

Dec. 19, 2008  (JP) .................................. 2008-324780

(51) Int. Cl.
    G02F 1/1337    (2006.01)
    G02F 1/1343    (2006.01)

(52) U.S. Cl.
    CPC ...... *G02F 1/134363* (2013.01); *G02F 1/1337* (2013.01)

(58) Field of Classification Search
    CPC combination set(s) only.
    See application file for complete search history.

(56) References Cited

U.S. PATENT DOCUMENTS

| | | |
|---|---|---|
| 2002/0008799 A1 | 1/2002 | Ota et al. |
| 2005/0078258 A1 | 4/2005 | Kim et al. |
| 2005/0179844 A1 | 8/2005 | Roosendaal et al. |
| 2008/0143939 A1 | 6/2008 | Adachi et al. |
| 2009/0128727 A1 | 5/2009 | Yata |
| 2009/0201455 A1* | 8/2009 | Murai ............... G02F 1/134363 349/139 |
| 2010/0157221 A1 | 6/2010 | Sakurai et al. |

FOREIGN PATENT DOCUMENTS

| | | |
|---|---|---|
| CN | 1607424 | 4/2005 |
| CN | 1653382 | 8/2005 |

(Continued)

OTHER PUBLICATIONS

Japanese Office Action dated Dec. 14, 2010, for corresponding Japanese Appln. No. 2008-324780.

(Continued)

*Primary Examiner* — Lauren Nguyen
(74) *Attorney, Agent, or Firm* — K&L Gates LLP

(57) ABSTRACT

A liquid crystal panel includes: first and second substrates arranged to be opposite each other at a predetermined gap; a liquid crystal layer filled between the first and second substrates; alignment films; a counter electrode pattern formed on the first substrate; and a pixel electrode pattern formed on the first substrate so as to have a plurality of electrode branches, wherein the extension direction of at least one of slits formed at both ends from among slits formed between the plurality of electrode branches crosses the alignment direction of the liquid crystal layer at an angle of 7° or larger.

10 Claims, 30 Drawing Sheets

(56) References Cited

FOREIGN PATENT DOCUMENTS

| | | |
|---|---|---|
| JP | 11-202356 | 5/1998 |
| JP | 10-123482 | 7/1999 |
| JP | 2002-323706 | 11/2002 |
| JP | 2006-317905 | 11/2006 |
| JP | 2007-004125 | 1/2007 |
| JP | 2007-034151 | 2/2007 |
| JP | 2008-046184 | 2/2008 |
| JP | 2008-151817 | 7/2008 |
| JP | 2009-145366 | 7/2009 |
| KR | 10-20040022287 | 3/2004 |
| KR | 10-2006-0077852 | 2/2007 |
| KR | 10-20070101071 | 10/2007 |
| KR | 10-20080067729 | 7/2008 |

OTHER PUBLICATIONS

Japanese Patent Office, Notification of reasons for refusal issued in connection with Japanese Patent Application No. 2011-026958, dated Aug. 14, 2012. (3 pages).
Japanese Office Action dated Oct. 30, 2012 for corresponding Japanese Application No. 2011026958.
Korean Office Action dated Nov. 20, 2015 in corresponding Korean Application No. 10-2009-0125517.

\* cited by examiner

LIQUID CRYSTAL PANEL AND PIXEL STRUCTURE THEREOF

CROSS REFERENCES TO RELATED APPLICATIONS

The present application is a continuation application of U.S. patent application Ser. No. 12/642,346, filed on Dec. 18, 2009, which application claims priority to JP 2008-324780 filed in the Japan Patent Office on Dec. 19, 2008, the entire contents of which is hereby incorporated by reference.

BACKGROUND

The present application relates to a transverse electric field driving liquid crystal panel which performs rotation control of the arrangement of liquid crystal molecules in parallel to a substrate surface by a transverse electric field generated between a pixel electrode and a counter electrode. The present application also relates to an electronic apparatus having the liquid crystal panel mounted therein.

At present, liquid crystal panels have various panel structures corresponding to various driving methods including a vertical electric field display type in which an electric field is generated in the vertical direction with respect to the panel surface. For example, a transverse electric field display type panel structure is suggested in which an electric field is generated in the horizontal direction with respect to the panel surface.

In the transverse electric field display type liquid crystal panel, the rotation direction of liquid crystal molecules is parallel to the substrate surface. That is, in the transverse electric field display type liquid crystal panel, there is little rotation of the liquid crystal molecules in the vertical direction with respect to the substrate surface. For this reason, changes in the optical characteristics (contrast, luminance, and color tone) are comparatively small. That is, the transverse electric field display type liquid crystal panel has a wider viewing angle than the vertical electric field display type liquid crystal panel.

FIG. 1 shows an example of the sectional structure of a pixel region constituting a transverse electric field display type liquid crystal panel. FIG. 2 shows an example of the corresponding planar structure.

A liquid crystal panel 1 has two glass substrates 3 and 5, and a liquid crystal layer 7 filled so as to be sandwiched with the glass substrates 3 and 5. A polarizing plate 9 is disposed on the outer surface of each substrate, and an alignment film 11 is disposed on the inner surface of each substrate. Note that the alignment film 11 is used to arrange a group of liquid crystal molecules of the liquid crystal layer 7 in a predetermined direction. In general, a polyimide film is used.

On the glass substrate 5, a pixel electrode 13 and a counter electrode 15 are formed of a transparent conductive film. Of these, the pixel electrode 13 is structured such that both ends of five comb-shaped electrode branches 13A are respectively connected by connection portions 13B. Meanwhile, the counter electrode 15 is formed below the electrode branches 13A (near the glass substrate 5) so as to cover the entire pixel region. This electrode structure causes a parabolic electric field between the electrode branches 13A and the counter electrode 15. In FIG. 1, this electric field is indicated by a broken line with arrow.

The pixel region corresponds to a region surrounded by signal lines 21 and scanning lines 23 shown in FIG. 2. In each pixel region, a thin film transistor for controlling the application of a signal potential to the pixel electrode 13 is disposed. The gate electrode of the thin film transistor is connected to a scanning line 23, so the thin film transistor is turned on/off by the potential of the scanning line 23.

One main electrode of the thin film transistor is connected to a signal line 21 through an interconnect pattern (not shown), and the other main electrode of the thin film transistor is connected to a pixel electrode contact portion 25. Thus, when the thin film transistor is turned on, the signal line 21 and the pixel electrode 13 are connected to each other.

As shown in FIG. 2, in this specification, a gap between the electrode branches 13A is called a slit 31. In FIG. 2, the extension direction of the slit 31 is identical to the extension direction of the signal line 21.

For reference, FIGS. 3A and 3B show the sectional structure around the contact 25.

JP-A-10-123482 and JP-A-11-202356 are examples of the related art.

SUMMARY

In the transverse electric field display type liquid crystal panel, it is known that, as shown in FIG. 4, the alignment of the liquid crystal molecules is likely to be disturbed at both ends of the slit 31 in the longitudinal direction (around the connection portion of the electrode branches 13A and the connection portion 13B). This phenomenon is called disclination. In FIG. 4, regions 41 where the arrangement of the liquid crystal molecules is disturbed due to occurrence of disclination are shaded. In FIG. 4, the alignment of the liquid crystal molecules is disturbed at twelve regions 41 in total.

If external pressure (finger press or the like) is applied to the disclination, the disturbance of the arrangement of the liquid crystal molecules is expanded along the extension direction of the electrode branches 13A. Note that the disturbance of the arrangement of the liquid crystal molecules is applied such that the arrangement of the liquid crystal molecules is rotated in a direction opposite to the electric field direction. This phenomenon is called a reverse twist phenomenon.

FIGS. 5 and 6 show examples of the occurrence of a reverse twist phenomenon. In FIGS. 5 and 6, regions 43 where the arrangement of the liquid crystal molecules is disturbed are shaded. These regions extend along the extension direction of the electrode branches 13A.

In the case of the liquid crystal panel being used at present, if the reverse twist phenomenon occurs once, the original state is not restored after it has been left uncontrolled. This is because the disclination expanded from the upper portion of the pixel is linked with the disclination expanded from the lower portion of the pixel at the central portion of the pixel to form a stabilized state, and the alignment direction of the liquid crystal molecules in the regions 43 is not restored to the original state. As a result, the regions 43 where the reverse twist phenomenon occurs may be viewed as residual images (that is, display irregularity).

Hereinafter, the residual image is called a reverse twist line.

The reverse twist line occurs along all the electrode branches 13A, and most conspicuously occurs in the electrode branch 13A at the right end in the drawing.

An embodiment provides a liquid crystal panel. The liquid crystal panel includes first and second substrates arranged to be opposite each other at a predetermined gap, a liquid crystal layer filled between the first and second substrates, alignment films, a counter electrode pattern formed on the first substrate, and a pixel electrode pattern formed on the first substrate so as to have a plurality of electrode branches. The extension direction of at least one of slits formed at both ends from among slits formed between the plurality of electrode branches crosses the alignment direction of the liquid crystal layer at an angle of 7° or larger.

The cross angle between the extension direction of at least one of the slits formed at both ends and the alignment direction of the liquid crystal layer may be equal to or larger than 7° and equal to or smaller than 15°. The cross angle between the extension direction of at least one of slits formed at both ends and the alignment direction of the liquid crystal layer may be larger than the cross angle between the extension direction of the other slit and the alignment direction of the liquid crystal layer. The pixel electrode pattern and the counter electrode pattern may be formed on the same layer surface, or may be formed on different layer surfaces. That is, if the liquid crystal panel is a transverse electric field display type liquid crystal panel, and the pixel electrode has a slit, the sectional structure of the pixel region is not limited.

The inventors have focused on the slit position where a reverse twist line is likely to conspicuously appear, and have increased the alignment stability of the relevant slit position so as to improve the reverse twist line. Specifically, the pixel electrode pattern or the alignment film is formed such that the extension direction of at least one of the slits formed at both ends from among the slits formed between the plurality of electrode branches crosses the alignment direction of the liquid crystal layer at a cross angle of 7° or larger.

With this pixel structure, a display panel can be realized in which, even though a reverse twist line occurs, the reverse twist line can be reduced when the display panel is left uncontrolled.

Additional features and advantages are described herein, and will be apparent from the following Detailed Description and the figures.

DETAILED DESCRIPTION

Embodiments of the present application will be described below in detail with reference to the drawings.

(A) Appearance Example of Liquid Crystal Panel Module and Panel Structure (B) Characteristics Found between Extension Direction of Slit and Alignment Direction of Liquid Crystal Layer (C) Pixel Structure Example 1: Single domain Structure Example (D) Pixel Structure Example 2: Single domain Structure Example (E) Pixel Structure Example 3: Single domain Structure Example (F) Pixel Structure Example 4: Single domain Structure Example (G) Pixel Structure Example 5: Dual Domain Structure Example (vertical mirror structure over two pixels)

(H) Pixel Structure Example 6: Dual Domain Structure Example (vertical mirror structure over two pixels)

(I) Pixel Structure Example 7: Dual Domain Structure Example (vertical mirror structure in one pixel)

(J) Pixel Structure Example 8: Dual Domain Structure Example (vertical mirror structure in one pixel)

(K) Pixel Structure Example 9: Dual Domain Structure Example (vertical mirror structure in one pixel)

(L) Pixel Structure Example 10: Dual Domain Structure Example (vertical mirror structure in one pixel)

(M) Pixel Structure Example 11: Different Pixel Structure Example (N) Pixel Structure Example 12: Different Pixel Structure Example (O) Pixel Structure Example 13: Different Pixel Structure Example (P) Pixel Structure Example 14: Different Pixel Structure Example (Q) Other Examples Elements which are not provided with particular drawings or descriptions herein are realized by existing techniques in the relevant technical field. Embodiments described below are exemplary, and not limiting to the present application.

(A) Appearance Example of Liquid Crystal Panel Module and Panel Structure

Figure 7:
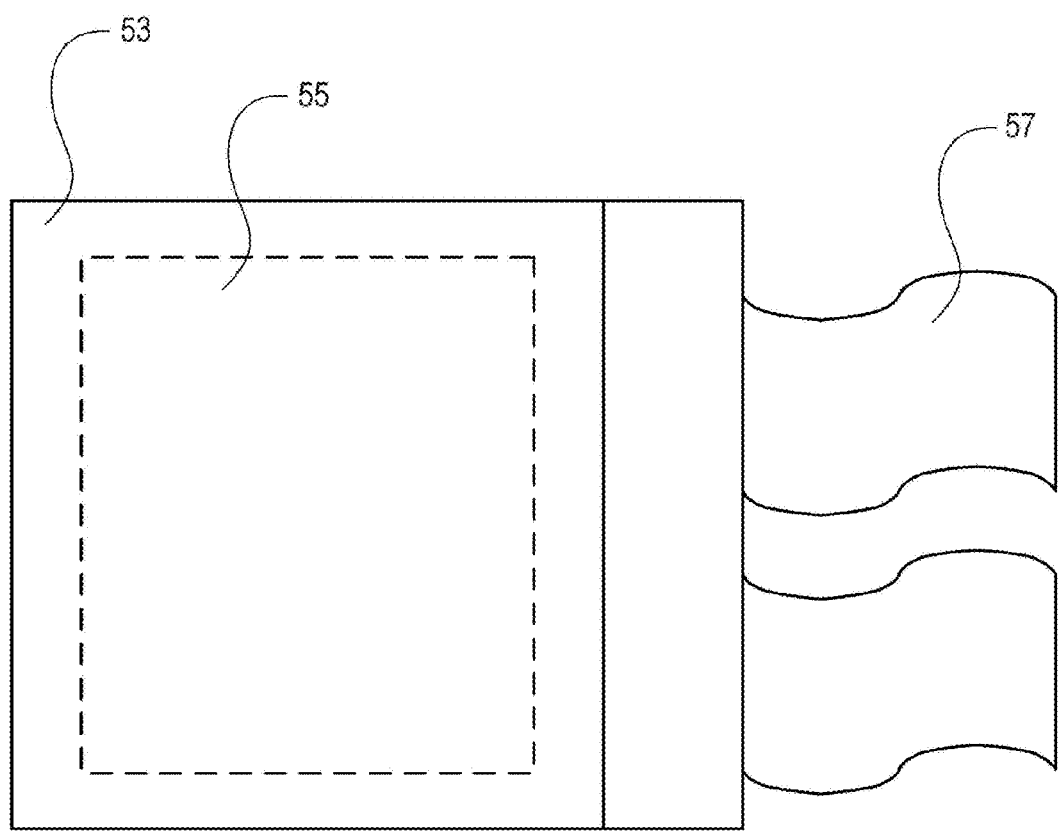
FIG. 7 is a diagram showing an appearance example of a liquid crystal panel module.

FIG. 7 shows an appearance example of a liquid crystal panel module 51.

The liquid crystal panel module 51 is structured such that a counter substrate 55 is bonded to a support substrate 53. The support substrate 53 is made of glass, plastic, or other substrates. The counter substrate 55 is also made of glass, plastic, or other transparent substrates. The counter substrate 55 is a member which seals the surface of the support substrate 53 with a sealant interposed therebetween.

Note that only one substrate on the light emission side may be a transparent substrate, and the other substrate may be a nontransparent substrate.

Further, the liquid crystal panel 51 is provided with an FPC (Flexible Printed Circuit) 57 for inputting an external signal or driving power supply, if necessary.

Figure 8:
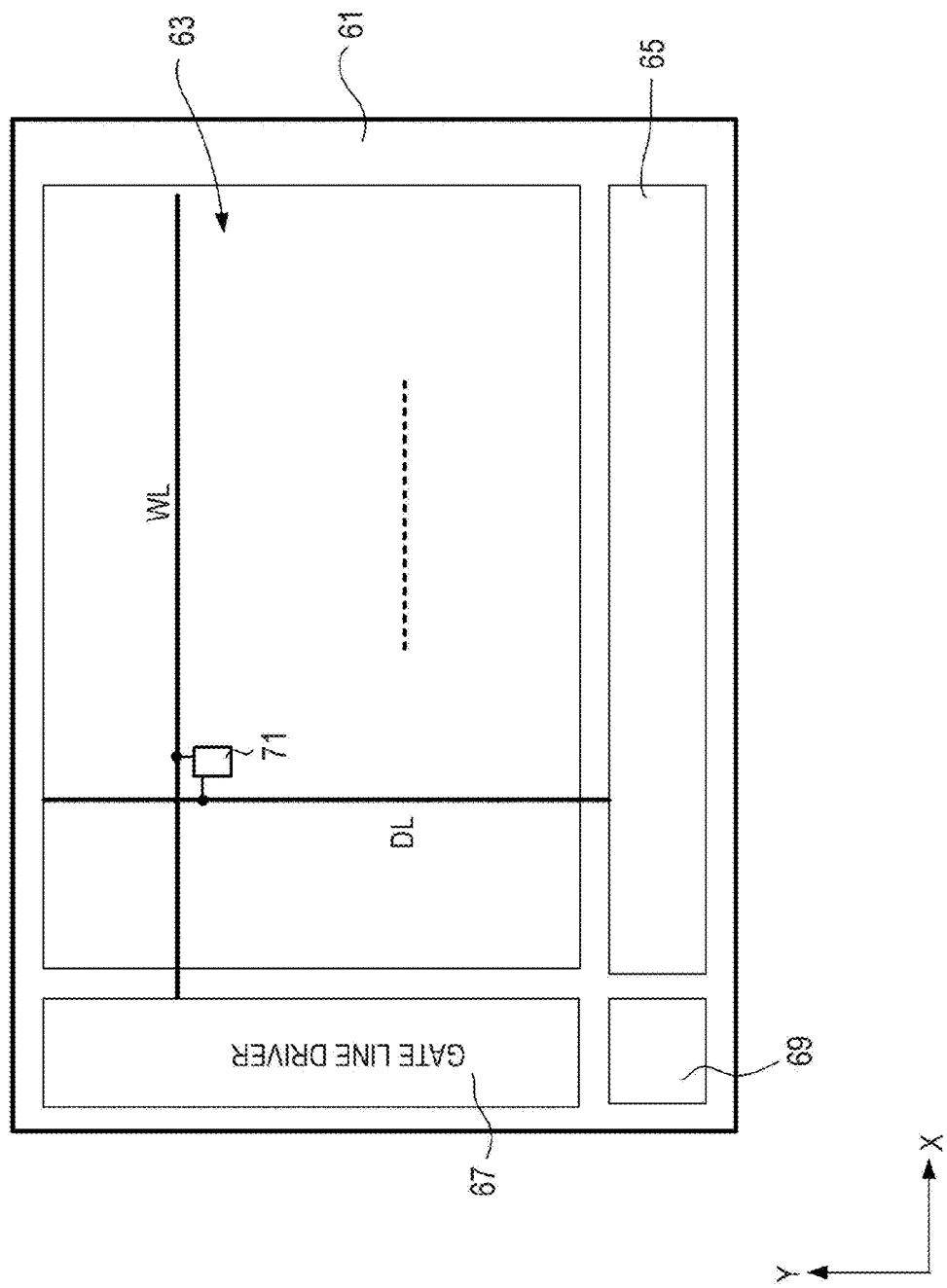
FIG. 8 is a diagram showing an example of the system configuration of a liquid crystal panel module.

FIG. 8 shows an example of the system configuration of the liquid crystal panel module 51. The liquid crystal panel module 51 is configured such that a pixel array section 63, a signal line driver 65, a gate line driver 67, and a timing controller 69 are disposed on a lower glass substrate 61 (corresponding to the glass substrate 5 of FIG. 1). In this embodiment, the driving circuit of the pixel array section 63 is formed as a single or a plurality of semiconductor integrated circuits, and is mounted on the glass substrate.

The pixel array section 63 has a matrix structure in which white units each constituting one pixel for display are arranged in M rows×N columns. In this specification, the row refers to a pixel row of 3×N subpixels 71 arranged in the X-axis direction of the drawing. The column refers to a pixel column of M subpixels 71 arranged in the Y-axis direction of the drawing. Of course, the values M and N are determined depending on the display resolution in the vertical direction and the display resolution in the horizontal direction.

The signal line driver 65 is used to apply a signal potential Vsig corresponding to a pixel gradation value to signal lines DL. In this embodiment, the signal lines DL are arranged so as to extend in the Y-axis direction of the drawing.

The gate line driver 67 is used to apply control pulses for providing the write timing of the signal potential Vsig to scanning lines WL. In this embodiment, the scanning lines WL are arranged so as to extend in the X-axis direction of the drawing.

A thin film transistor (not shown) is formed in each subpixel 71. The thin film transistor has a gate electrode connected to a corresponding one of the scanning lines WL, one main electrode connected to a corresponding one of the signal lines DL, and the other main electrode connected to the pixel electrode 13.

The timing controller 69 is a circuit device which supplies driving pulses to the signal line driver 65 and the gate line driver 67.

(B) Characteristics Found Between Extension Direction of Slit and Alignment Direction of Liquid Crystal Layer As described above, in the existing pixel structure, if disturbance (reverse twist phenomenon) of the alignment of the liquid crystal molecules occurs due to finger press or the like, the alignment disturbance is continuously viewed as display irregularity.

Accordingly, the inventors have experimented on whether disturbance of the alignment of the liquid crystal molecules can be reduced by itself or not by changing the cross angle between the extension direction of each slit 31 formed by the electrode branches 13A of the pixel electrode 13 and the alignment direction of the liquid crystal layer 7. The alignment direction of the liquid crystal layer 7 (also referred to as "alignment direction of liquid crystal") is defined by the orientation of dielectric anisotropy of liquid crystal, and refers to a direction with a large dielectric constant.

Hereinafter, the characteristics which become clear experimentally will be described.

Figure 9:
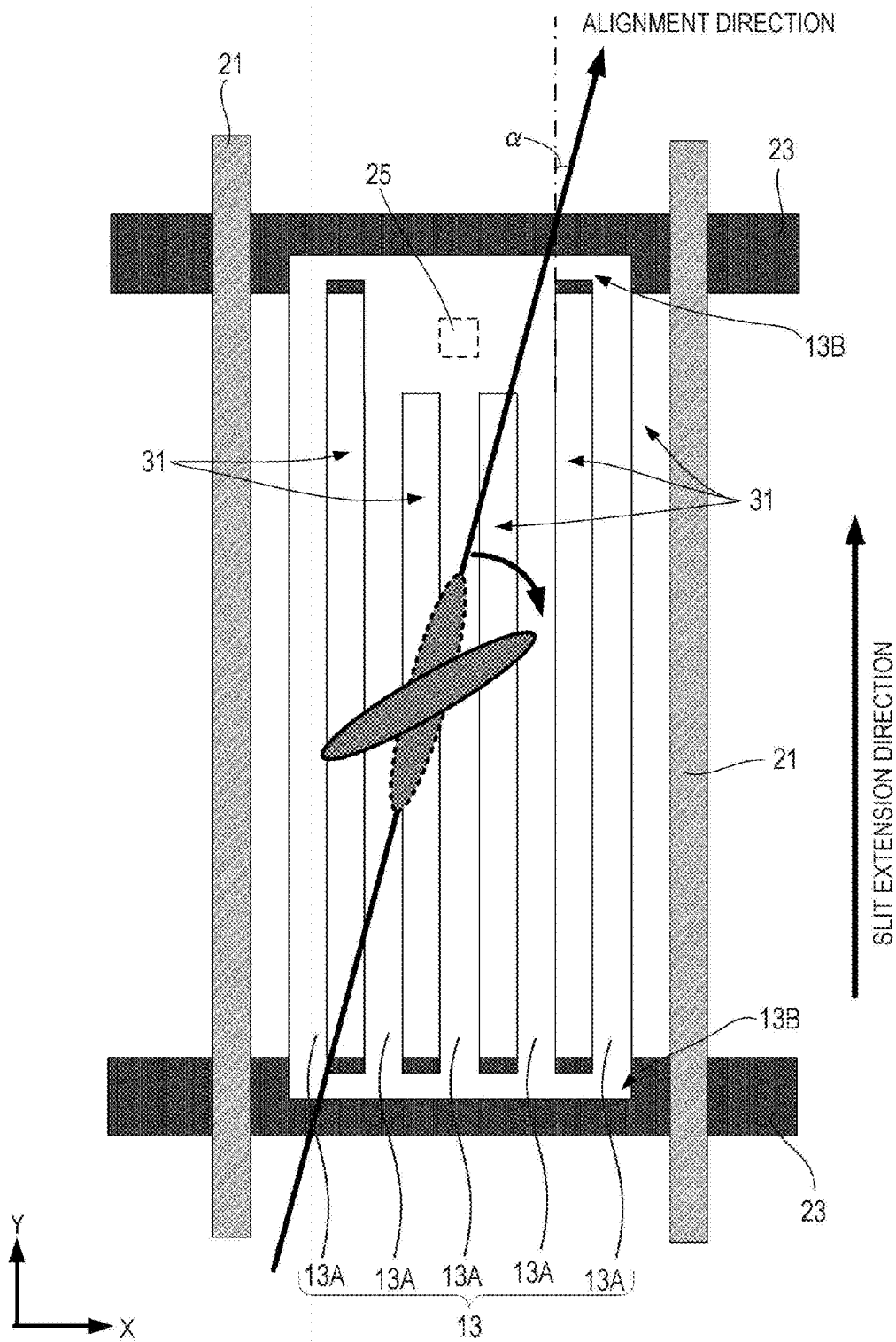
FIG. 9 is a diagram illustrating the cross angle between the extension direction of each slit and the alignment direction of a liquid crystal layer.

First, the relationship between the slit 31 and the alignment direction of the liquid crystal layer 7 will be described with reference to FIG. 9. FIG. 9 is a diagram showing the planar structure of the subpixel 71. In FIG. 9, the relationship between the extension direction of the slit 31 and the alignment direction of the liquid crystal layer 7 is focused on. For this reason, a thin film transistor for driving the pixel electrode 13, and the like are not shown.

Figure 2:
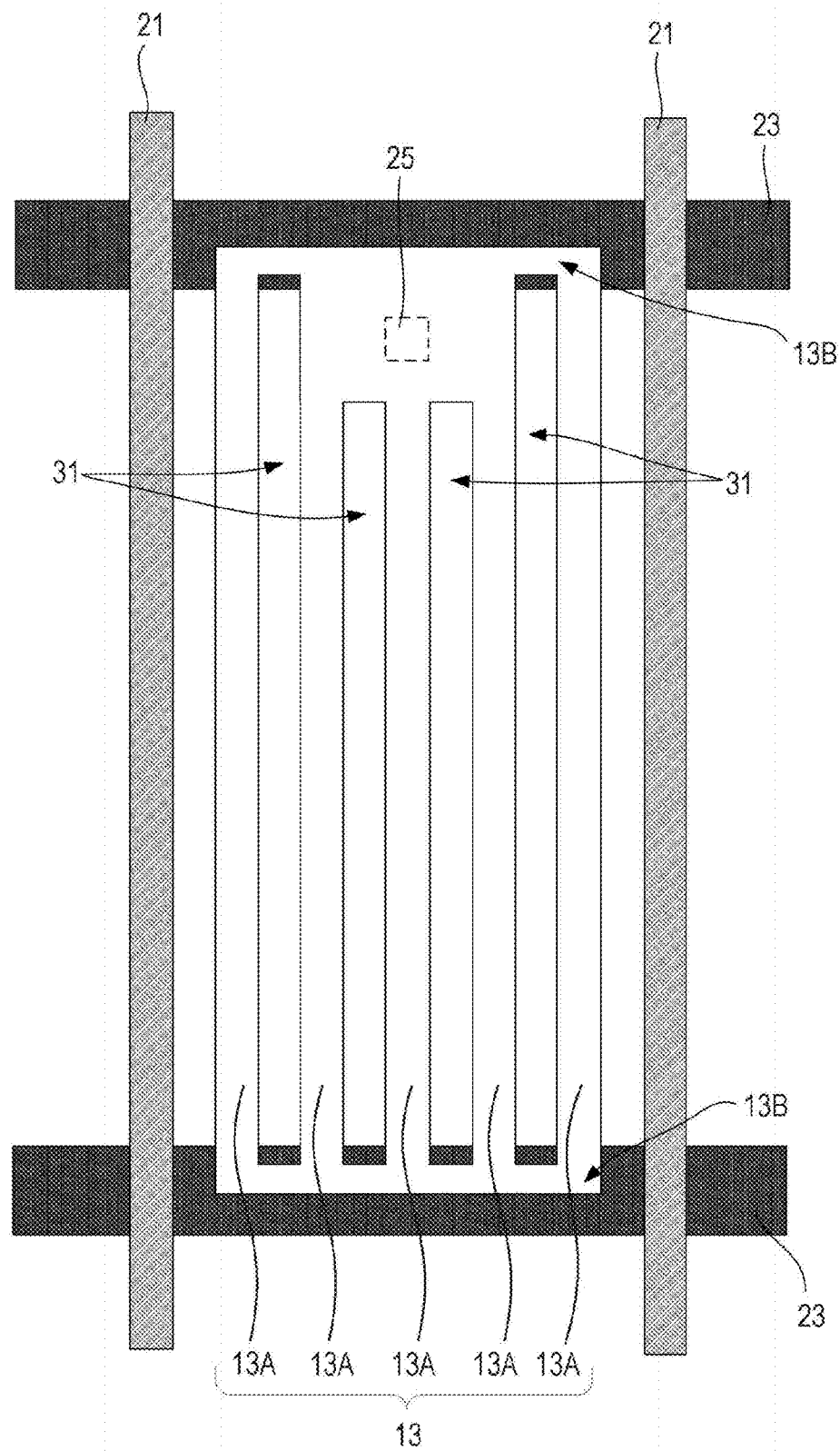
FIG. 2 is a diagram illustrating an example of the planar structure of a transverse electric field display type liquid crystal panel.
Figure 3A:
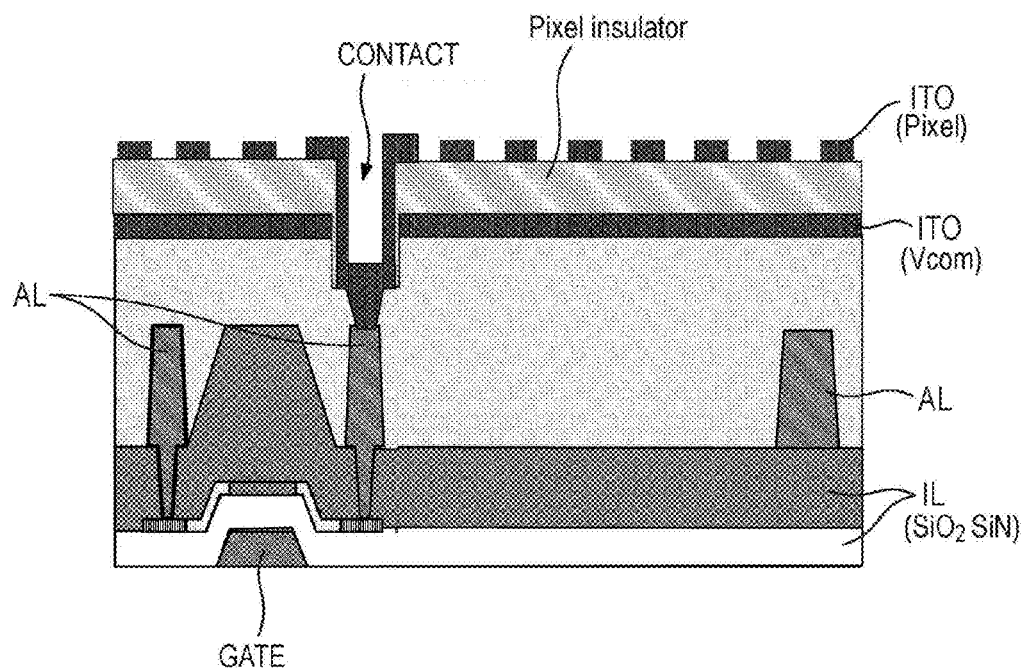
FIGS. 3A and 3B are diagrams showing an example of the sectional structure around a contact.
Figure 3B:
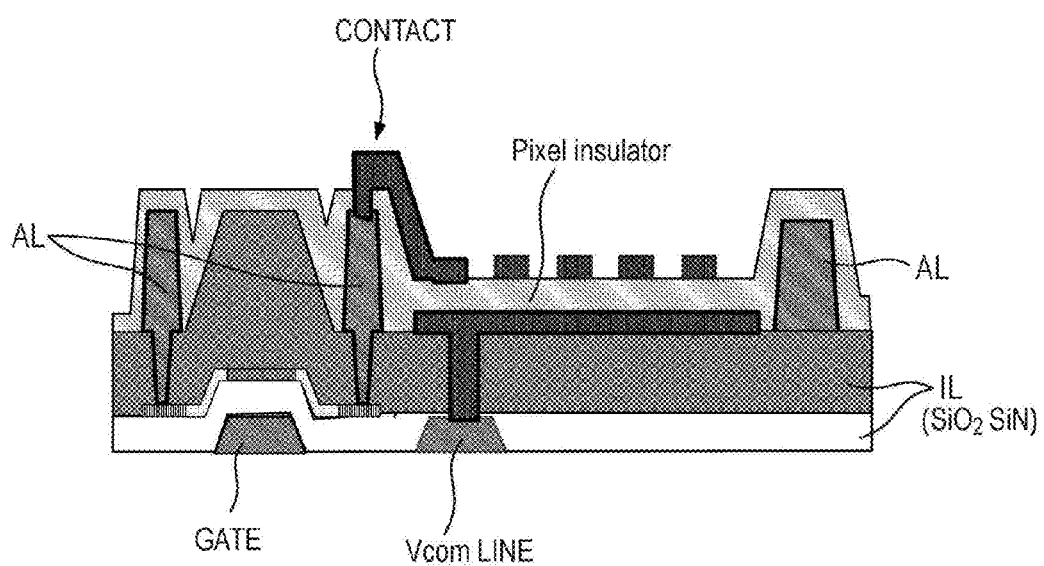
Figure 4:
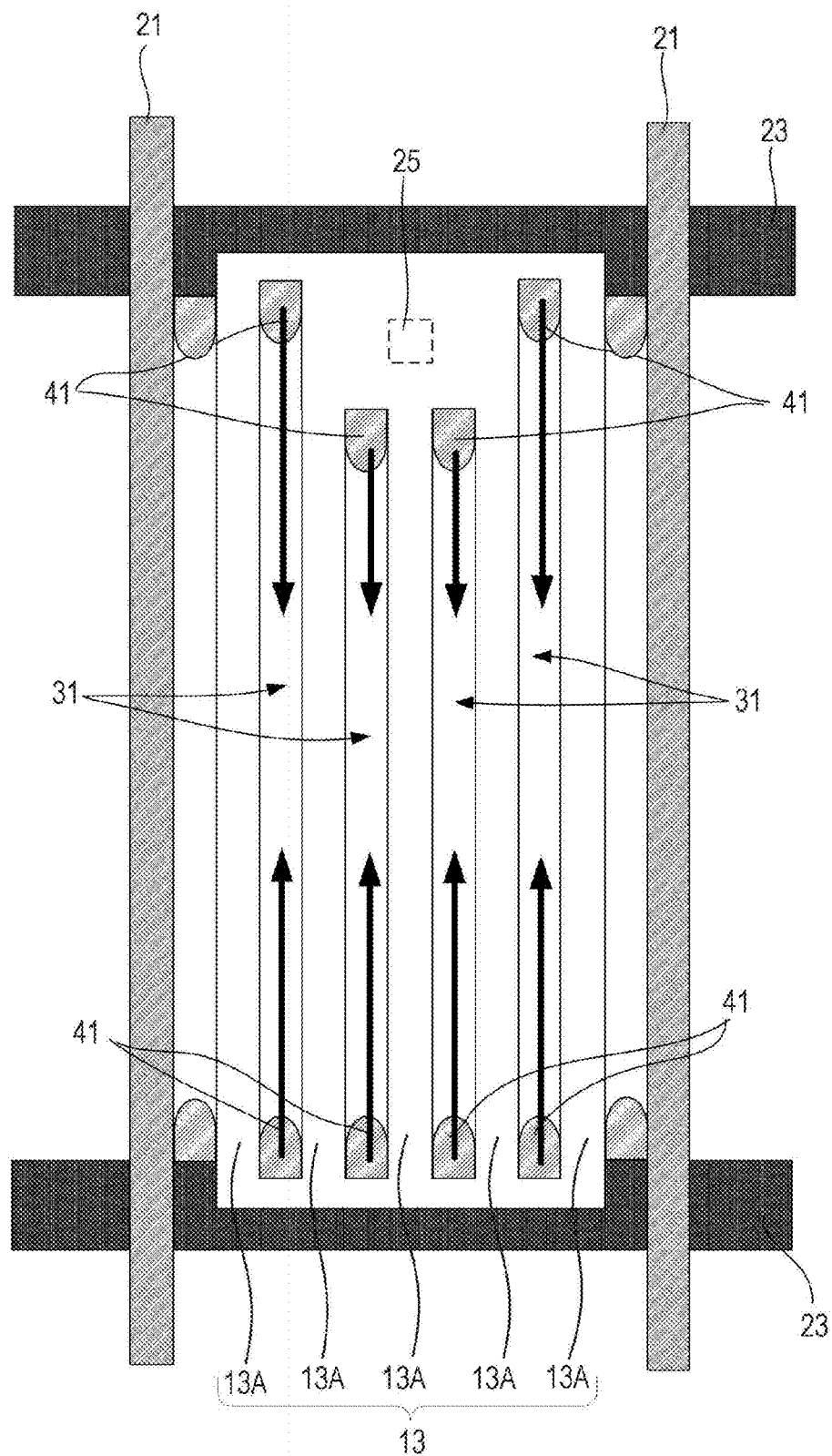
FIG. 4 is a diagram illustrating disclination.

The planar structure of FIG. 9 is identical to the planar structure described with reference to FIG. 2, and the corresponding elements are represented by the same reference numerals. That is, the subpixel 71 is formed in a rectangular region surrounded by the signal lines 21 extending in the Y-axis direction and the scanning lines 23 extending in the X-axis direction. The pixel electrode 13 has five electrode branches 13A and connection portions 13B respectively connecting both ends of the electrode branches 13A. In FIG. 9, the slits 31 formed between the electrode branches 13A or the slit 31 formed between the electrode branches 13A and the signal line 21 on the right side in the drawing extend in the Y-axis direction.

That is, the extension direction of each slit 31 is parallel to the signal line 21 and perpendicular to the scanning line 23.

In FIG. 9, the alignment direction of the liquid crystal layer 7 is indicated by an arrow. In FIG. 9, the clockwise direction with respect to the Y axis is the alignment direction of the liquid crystal layer 7. In FIG. 9, the cross angle between the alignment direction of the liquid crystal layer 7 and the extension direction of each slit 31 is indicated by α.

The inventors have focused on the cross angle α, and have measured the time until display irregularity disappears with respect to various cross angles α.

Figure 10:
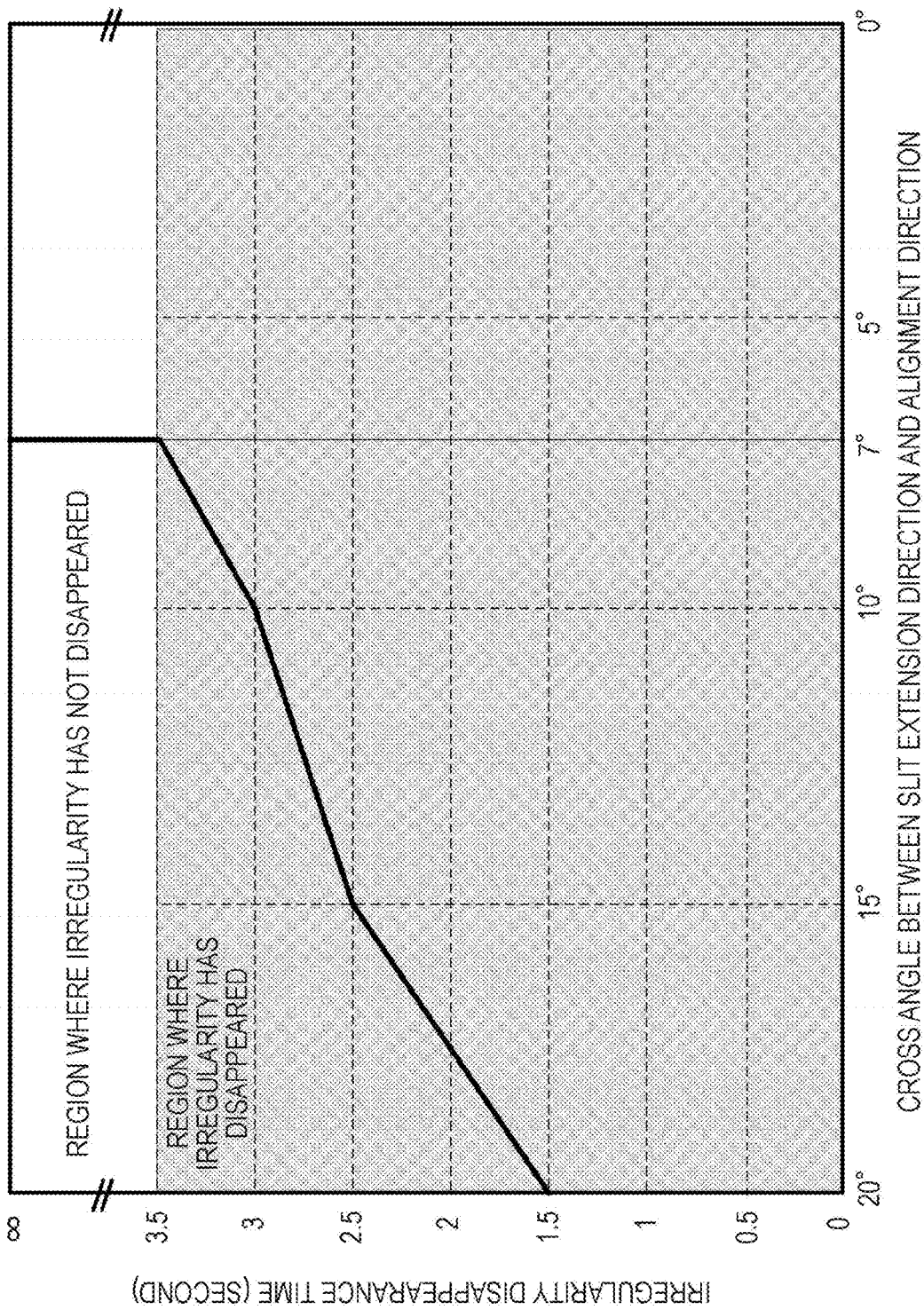
FIG. 10 is a diagram illustrating the relationship between the magnitude of a cross angle and display irregularity disappearance time.

FIG. 10 shows the measurement result. In FIG. 10, the horizontal axis represents the cross angle α between the extension direction of each slit 31 and the alignment direction of the liquid crystal layer 7, and the vertical axis represents the time until display irregularity disappears.

From the experiment result of FIG. 10, it has been confirmed that, when the cross angle α is smaller than 7°, display irregularity due to the reverse twist phenomenon does not disappear by itself Meanwhile, when the cross angle α is equal to or larger than 7°, it has been confirmed that display irregularity due to the reverse twist phenomenon can disappear by itself. When the cross angle α is 7°, the time until display irregularity disappears is 3.5 [seconds]. Further, from the experiment result, it has been confirmed that, as the cross angle α becomes larger, the time until display irregularity disappears is shortened. For example, when the cross angle α is 10°, it has been confirmed that display irregularity disappears in 3 [seconds]. When the cross angle α is 15°, it has been confirmed that display irregularity disappears in 2.5 [seconds]. When the cross angle α is 20°, it has been confirmed that display irregularity disappears in 1.5 [seconds].

As a result, the inventors have found that, if the cross angle α between the extension direction of each slit 31 and the alignment direction of the liquid crystal layer 7 is set to be equal to or larger than 7°, in the transverse electric field display type liquid crystal panel, the alignment stability of liquid crystal molecules during voltage application can be improved. That is, it has been found that, even though the reverse twist phenomenon occurs due to finger press or the like, the disturbance of the alignment can disappear by itself.

Figure 11:
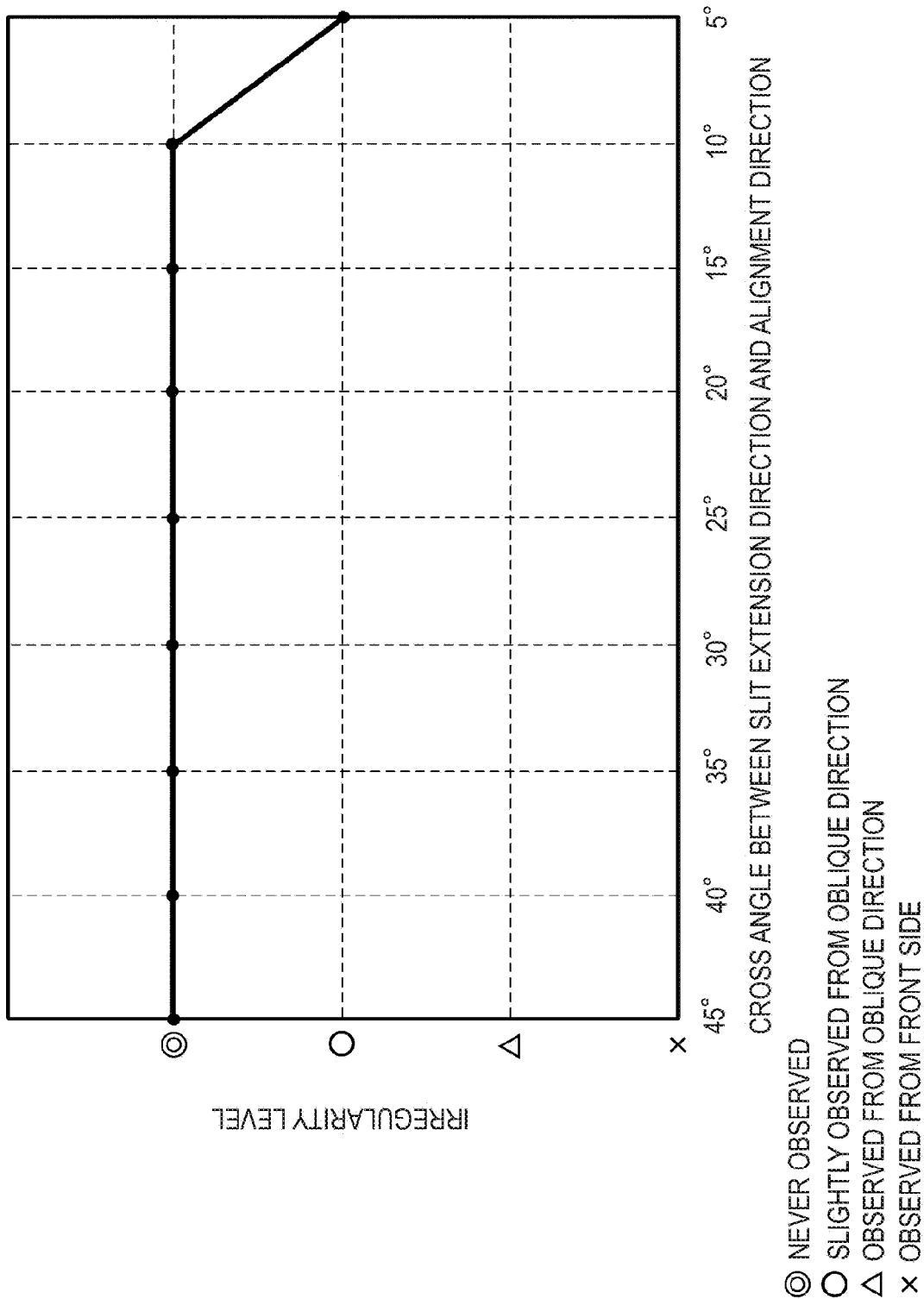
FIG. 11 is a diagram illustrating the relationship between the magnitude of a cross angle and the level of display irregularity.

FIG. 11 shows the observation result regarding the relationship between the cross angle α and the level of display irregularity. In FIG. 11, the horizontal axis denotes the cross angle α between the extension direction of the slit 31 and the alignment direction of the liquid crystal layer 7, and the vertical axis denotes the visible level of display irregularity.

As shown in FIG. 11, if the cross angle α is equal to or larger than 10°, it has been confirmed that no display irregularity is observed even when the display screen is viewed at any angle. When the cross angle α is 5°, it has been confirmed that, when the display screen is viewed from an oblique direction, slight display irregularity is observed. When the cross angle α is equal to or larger than 5° and smaller than 10°, as shown in FIG. 11, it has been confirmed that visibility is gradually changed.

Figure 12:
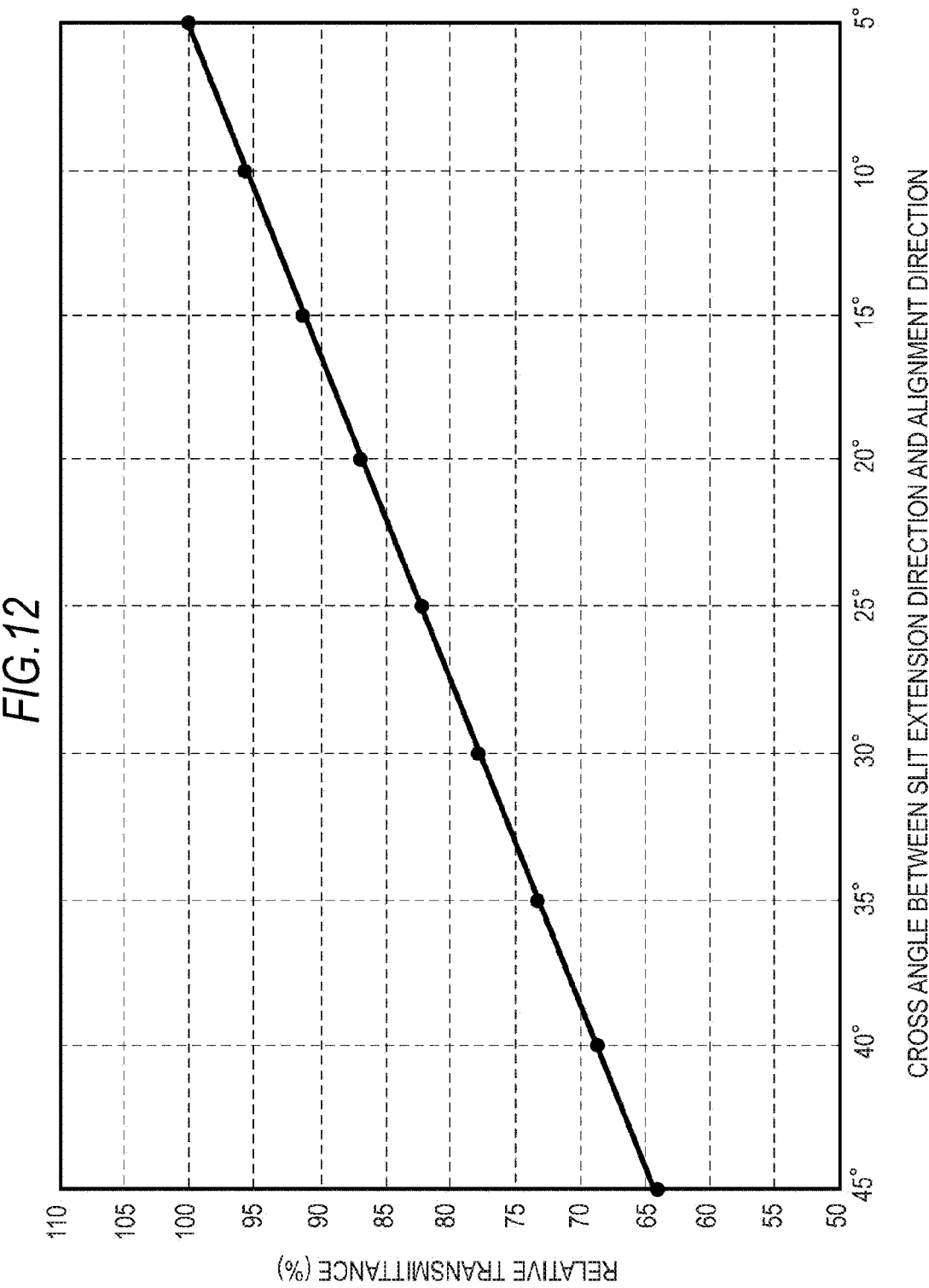
FIG. 12 is a diagram illustrating the relationship between the magnitude of a cross angle and relative transmittance.

However, it has been confirmed that, if the cross angle α is extremely large, the transmittance is lowered. FIG. 12 shows the confirmed transmission characteristics. In FIG. 12, the horizontal axis denotes the cross angle α between the extension direction of the slit 31 and the alignment direction of the liquid crystal layer 7, and the vertical axis denotes relative transmittance. In FIG. 12, it is assumed that, when the cross angle α is 5°, the relative transmittance is 100%.

In FIG. 12, when the cross angle α is 5°, the maximum transmittance is obtained, and when the cross angle α is 45°, the minimum transmittance is obtained. Note that, when the cross α is 45°, the relative transmittance is about 64%.

As shown in FIG. 12, it has been seen that the cross angle α and the relative transmittance have a roughly linear relationship. From the viewpoint of transmittance, it can be seen that, as the cross angle α is smaller, better display luminance is obtained.

From the above-described characteristics, the inventors have considered it preferable that the cross angle α between the extension direction of the slit 31 and the alignment direction of the liquid crystal layer 7 be equal to or larger than 7°.

Meanwhile, taking good relative transmittance and good display irregularity disappearance time into consideration, the inventors have considered it preferable that the cross angle α be equal to or larger than 7° and equal to or smaller than 15°.

(C) Pixel Structure Example 1

Figure 1:
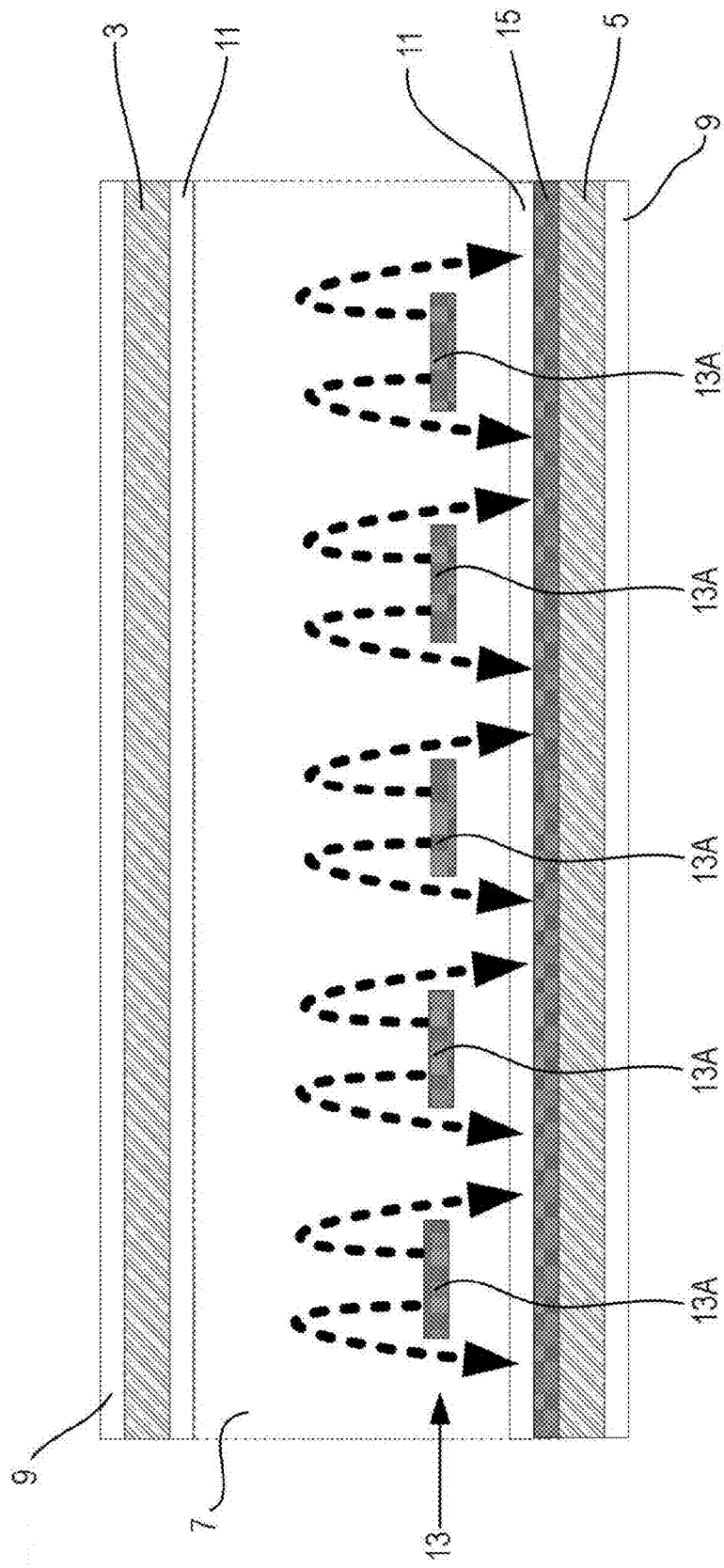
FIG. 1 is a diagram illustrating an example of the sectional structure of a transverse electric field display type liquid crystal panel.
Figure 13:
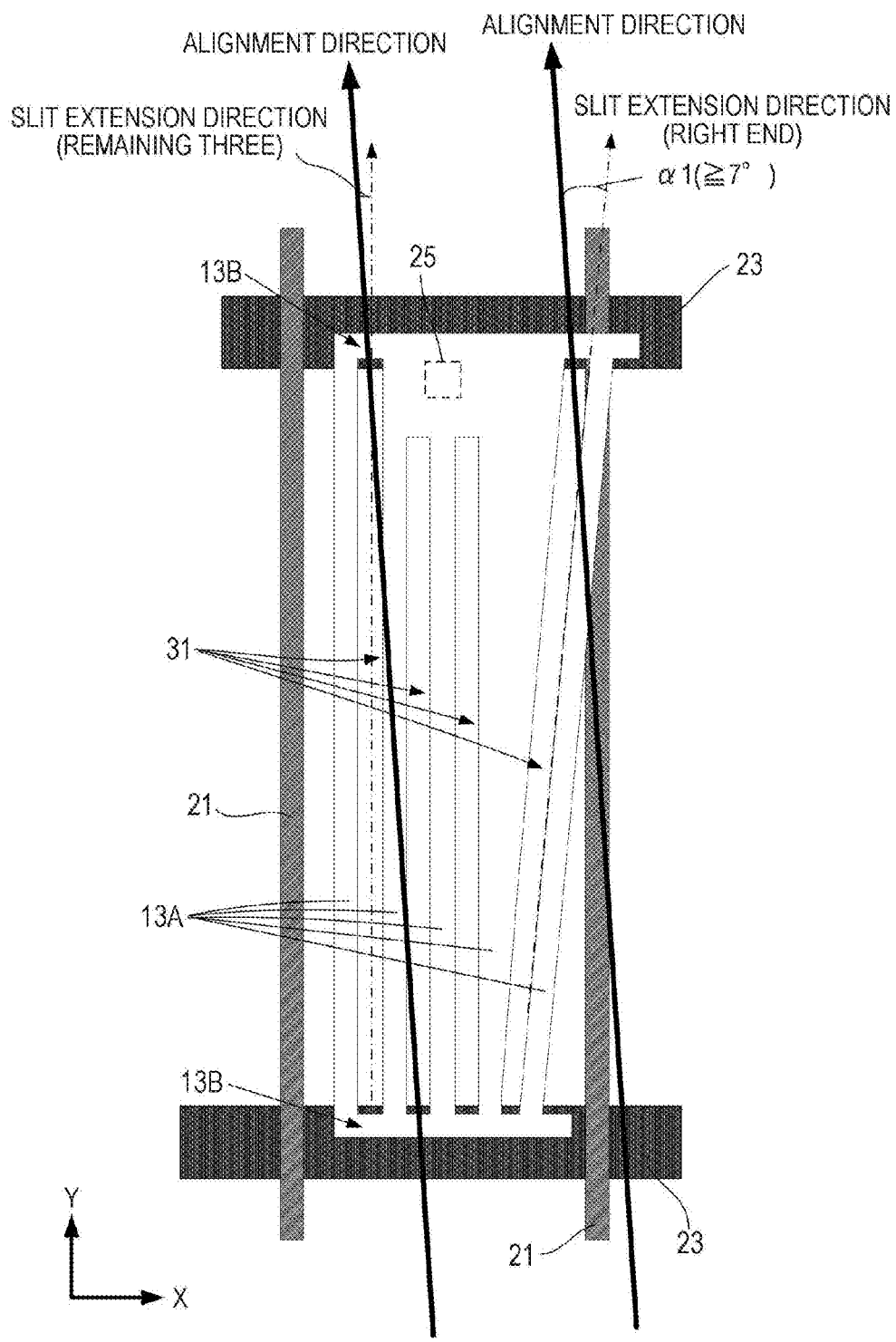
FIG. 13 is a diagram showing a first pixel structure example (planar structure).

The pixel structure shown in FIG. 13 is identical to the pixel structure described with reference to FIG. 9 and is used in an FFS (Fringe Field Switching) type liquid crystal panel. Thus, the sectional structure of the pixel region is the same as shown in FIG. 1. That is, the counter electrode 15 is disposed below the pixel electrode 13 so as to cover the entire pixel region.

The pixel structure of FIG. 13 is different from the pixel structure of FIG. 9 in that only one slit formed at the right end in the drawing from among the four slits 31 formed between the electrode branches 13A is formed obliquely in the clockwise direction with respect to the signal line 21. In FIG. 13, it is assumed that the alignment direction of the liquid crystal layer 7 is parallel to the signal line 21.

Thus, in FIG. 13, only the extension direction of the slit 31 formed at the right end in the drawing crosses the alignment direction of the liquid crystal layer 7 at a cross angle α1 (≥7°) of 7° or larger, and the extension direction of other three slits 31 are parallel to the alignment direction of the liquid crystal layer 7.

In FIG. 13, the four slits 31 are set to have the same width.

The slit 31 at the right end of the pixel region in FIG. 13 is formed by rotating the upper end of the rectangular slit 31 in the drawing in the clockwise direction with the connection portion 13B at the lower end in the drawing as the origin. Specifically, the slit 31 at the right end in the drawing is formed to have a substantially parallelogram shape. In order to realize this shape, a study should be done. That is, the electrode pattern of the second electrode branch 13A from the right side in the drawing should be formed in an inverted trapezoidal shape.

The reason why the pixel structure of FIG. 13 is used is to improve deterioration in display quality due to a reverse twist line while minimizing degradation in the transmittance over the entire pixel region.

As described above, the extension direction of the slit 31 formed at the right end in the pixel region is set so as to cross the alignment direction of the liquid crystal layer 7 at the cross angle α1 of 7° or larger.

The slit 31 extending in an oblique direction in the pixel region is formed in a portion of the pixel region where the reverse twist phenomenon most conspicuously appears (or is viewed). Therefore, the reverse twist line which most conspicuously appears can be reliably eliminated. As a result, display quality can be significantly improved over the entire pixel region. In order to shorten the time until the reverse twist line disappears, the cross angle α1 is preferably large, but as described with reference to FIG. 12, if the cross angle α1 is extremely large, the transmittance is degraded.

Therefore, taking into consideration the balance with transmittance in the portion at the right end of the pixel region, it is preferable that the cross angle α1 is equal to or larger than 7° and equal to or smaller than 15°.

Figure 5:
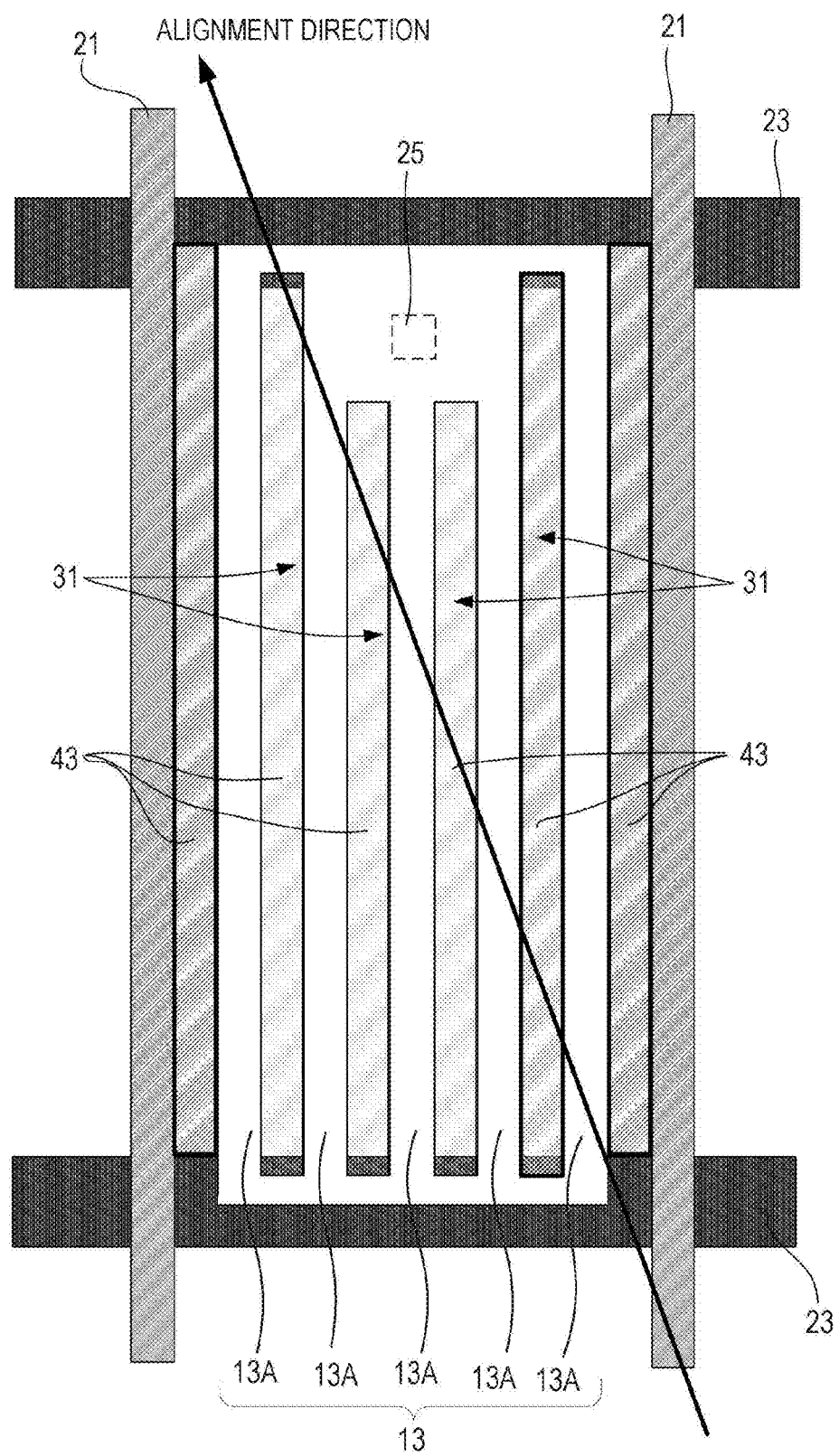
FIG. 5 is a diagram illustrating a reverse twist phenomenon.
Figure 6:
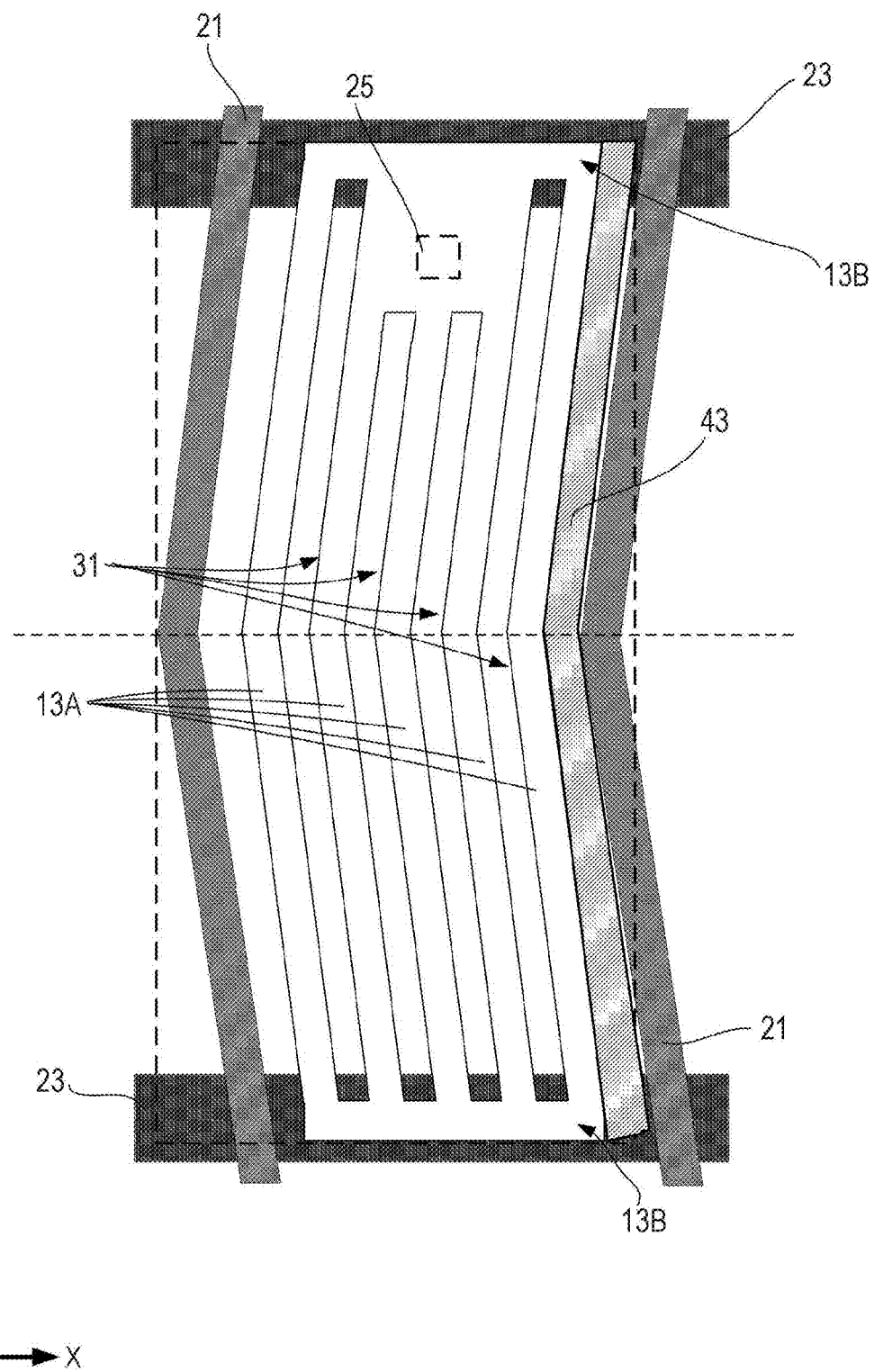
FIG. 6 is a diagram illustrating a reverse twist phenomenon.

The pixel structure of FIG. 13 is structured such that the extension direction of the remaining three slits 31 and the alignment direction of the liquid crystal layer 7 cross each other at about 3°. Therefore, in the regions where these slits 31 are formed, the reverse twist line is not eliminated. However, the reverse twist line conspicuously appears only in the region at the right end in the drawing where the slit 31 is formed obliquely, so display quality can be significantly improved as compared with the existing structure (FIG. 5).

As described with reference to FIG. 12, the cross angle between the extension direction of the three slits 31 and the alignment direction of the liquid crystal layer 7 is 0°, so the transmittance in the regions where the slits 31 are formed can be maximized.

As described above, in the pixel structure of FIG. 13, the degradation in the transmittance can be made small, and the deterioration in the display quality due to the reverse twist line can be reduced.

Of course, since the pixel structure is an FFS type pixel structure, the liquid crystal molecules above the pixel electrode 13 can be moved by a parabolic electric field formed between the pixel electrode 13 and the counter electrode 15. For this reason, a liquid crystal panel with a wide viewing angle can be realized.

(D) Pixel Structure Example 2

Figure 14:
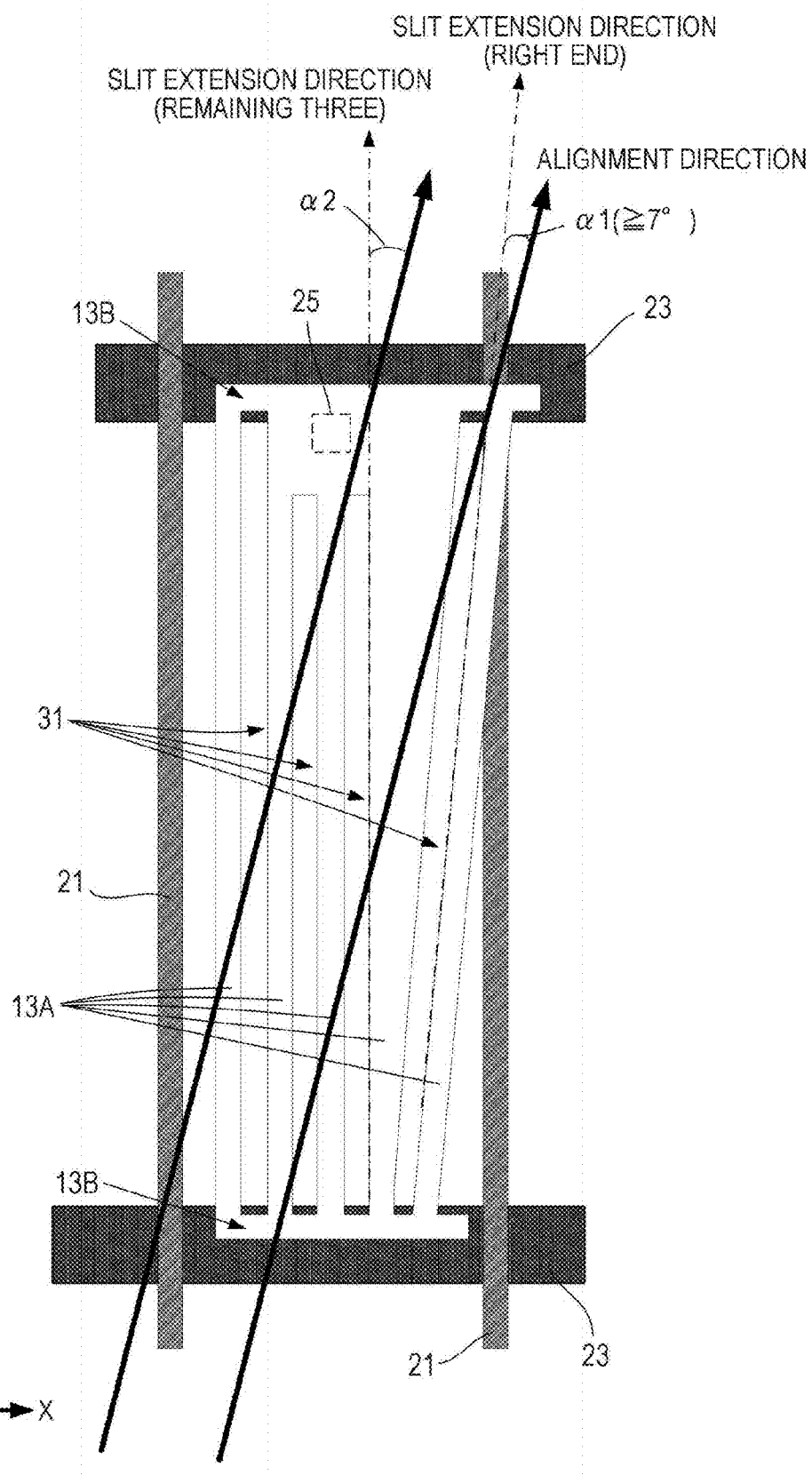
FIG. 14 is a diagram showing a second pixel structure example (planar structure).

FIG. 14 shows a second pixel structure example. This pixel structure is also identical to the first pixel structure described with reference to FIG. 13 and used in an FFS (Fringe Field Switching) type liquid crystal panel. The pattern structure of the pixel electrode 13 is identical to the first pixel structure described with reference to FIG. 13.

A difference is the alignment direction of the liquid crystal layer 7.

In the pixel structure of FIG. 13, the alignment direction of the liquid crystal layer 7 is inclined at about 3° in the counterclockwise direction with respect to the signal line 21.

On the contrary, in the pixel structure of FIG. 14, it is assumed that the alignment direction of the liquid crystal layer 7 is inclined in the clockwise direction with respect to the Y-axis direction.

Of course, the inclination angles of the extension direction of the slit 31 and the alignment direction of the liquid crystal layer 7 are designed such that the extension direction of the slit 31 at the right end in the drawing where a reverse twist line is likely to conspicuously appear and the alignment direction of the liquid crystal layer 7 cross each other at the cross angle $\alpha 1$ of 7° or larger.

Therefore, similarly to the first pixel structure example, the alignment regulation force of the portion at the right end in the pixel region can be increased. As a result, the reverse twist line which most conspicuously appears in the pixel region can be reliably eliminated.

In this pixel structure example, the cross angle $\alpha 2$ between the extension direction of the remaining three slits 31 and the alignment direction of the liquid crystal layer 7 is larger than the cross angle $\alpha 1$.

The alignment stability of the slits 31 corresponding to the central portion and the portion at the left end in the pixel region is higher than that of the portion at the right end in the pixel region. As a result, the reverse twist lines in the three slits 31 can also be reliably eliminated. However, as described with reference to FIG. 12, as the cross angle $\alpha$ is larger, the transmittance is lowered. For this reason, in the pixel structure of FIG. 14, the transmittance of the pixel region is lowered as compared with the first pixel structure.

(E) Pixel Structure Example 3

Figure 15:
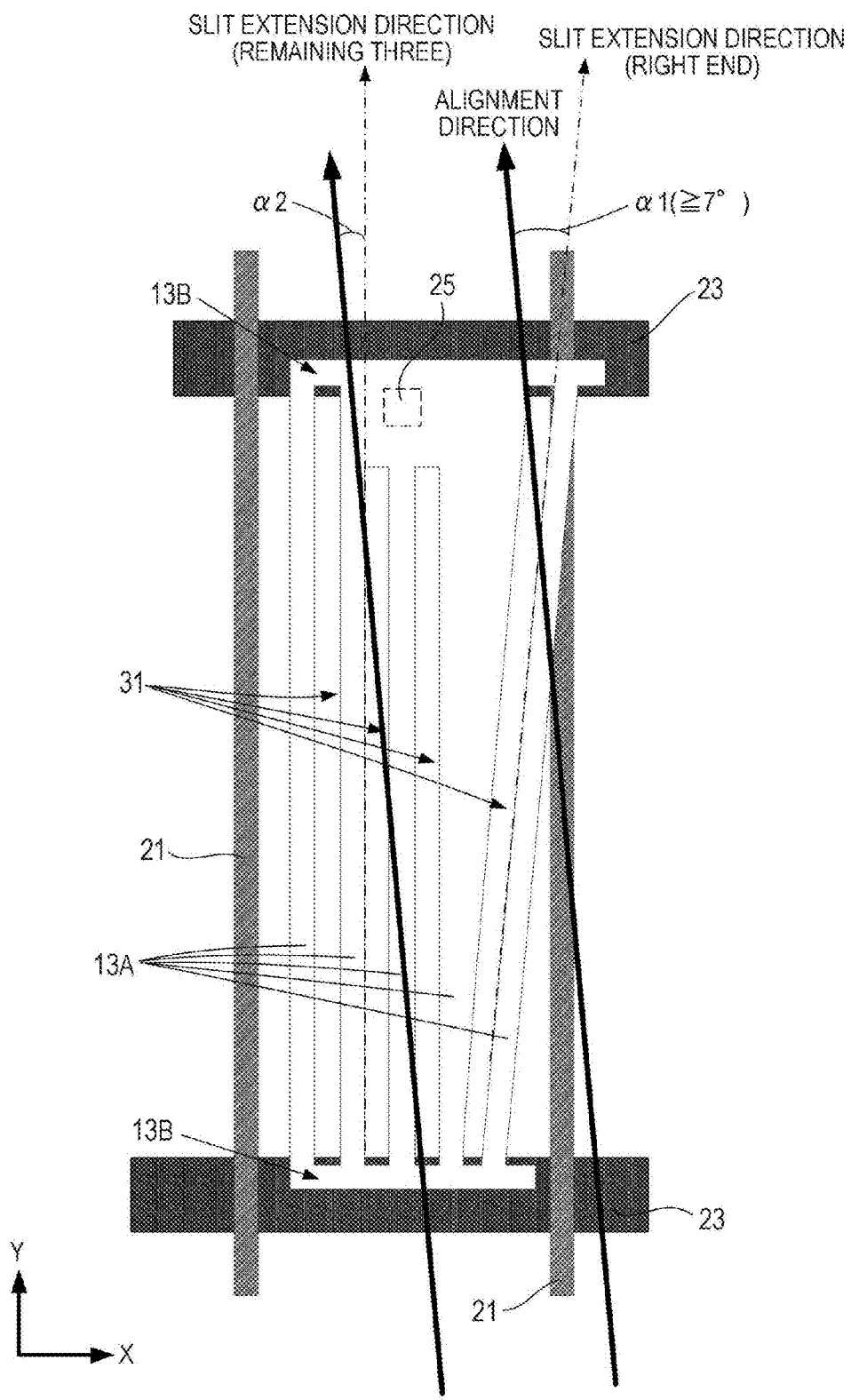
FIG. 15 is a diagram showing a third pixel structure example (planar structure).

FIG. 15 shows a third pixel structure example. This pixel structure is also identical to the first pixel structure described with reference to FIG. 13 and used in an FFS (Fringe Field Switching) type liquid crystal panel. The pattern structure of the pixel electrode 13 is identical to the above-described two pixel structures.

A difference is the alignment direction of the liquid crystal layer 7.

In the pixel structure of FIG. 15, it is assumed that the alignment direction of the liquid crystal layer 7 is signifi-cantly inclined in the counterclockwise direction with respect to the Y-axis direction.

In this case, the extension direction of the slit 31 formed at the right end in the drawing and the alignment direction of the liquid crystal layer 7 are inverted with respect to the Y axis.

Therefore, the cross angle $\alpha 2$ between the extension direction of the slit 31 formed in a portion other than the right end and the alignment direction of the liquid crystal layer 7 can be made smaller than the cross angle $\alpha 1$ between the extension direction of the slits 31 formed at the right end in the drawing and the alignment direction of the liquid crystal layer 7.

As a result, the function for reliably eliminating a reverse twist line which appears in the portion at the right end in the pixel region can be maintained as it is, and the transmittance in other regions can be increased as compared with the second pixel structure example.

(F) Pixel Structure Example 4

Figure 16:
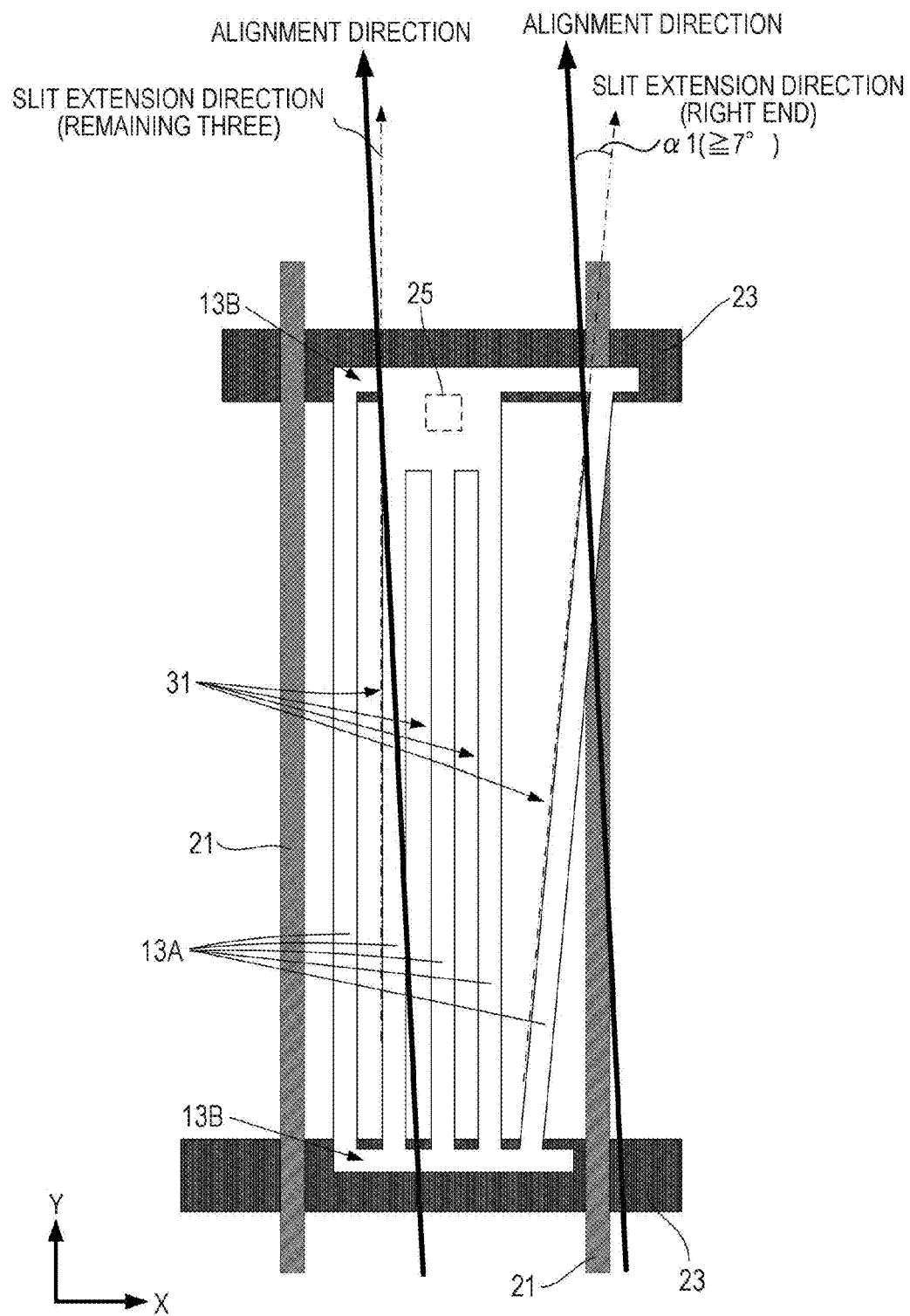
FIG. 16 is a diagram showing a fourth pixel structure example (planar structure).

FIG. 16 shows a fourth pixel structure example. This pixel structure is a modification corresponding to the first pixel structure example described with reference to FIG. 13.

The pixel structure of FIG. 16 is different from the pixel structure of FIG. 13 in that the shape of the slit 31 formed at the right end in the pixel region is different.

For example, in the first pixel structure, the four slits 31 in the pixel region are formed to have the same width.

In contrast, in the pixel structure of FIG. 16, the five electrode branches 13A are formed to have the same pattern width. For this reason, the slit 31 formed at the right end in the drawing is formed in a trapezoidal shape.

In the pixel electrode of FIG. 16, the extension direction of the slit formed at the right end in the drawing is identical to the extension direction of the electrode branches 13A. That is, only one slit 31 formed at the right end in the drawing is formed obliquely in the clockwise direction with respect to the signal line 21. Of course, the extension direction of other slits 31 is parallel to the signal line 21.

Therefore, in the pixel structure of FIG. 16, the transmittance of the entire pixel region is maintained at a high level, and the reverse twist line which most conspicuously appears in the pixel region can be reliably eliminated. That is, a liquid crystal panel with high pixel transmittance and high display quality can be realized.

The pattern shape of the fourth pixel electrode 13 may be applied to a case where the alignment direction of the liquid crystal layer 7 is inclined in the clockwise direction with respect to the signal line 21, or a case where the alignment direction of the liquid crystal layer 7 is inclined in the counterclockwise direction with respect to the signal line 21, as in the second pixel structure example or the third pixel structure example.

(G) Pixel Structure Example 5

Figure 17:
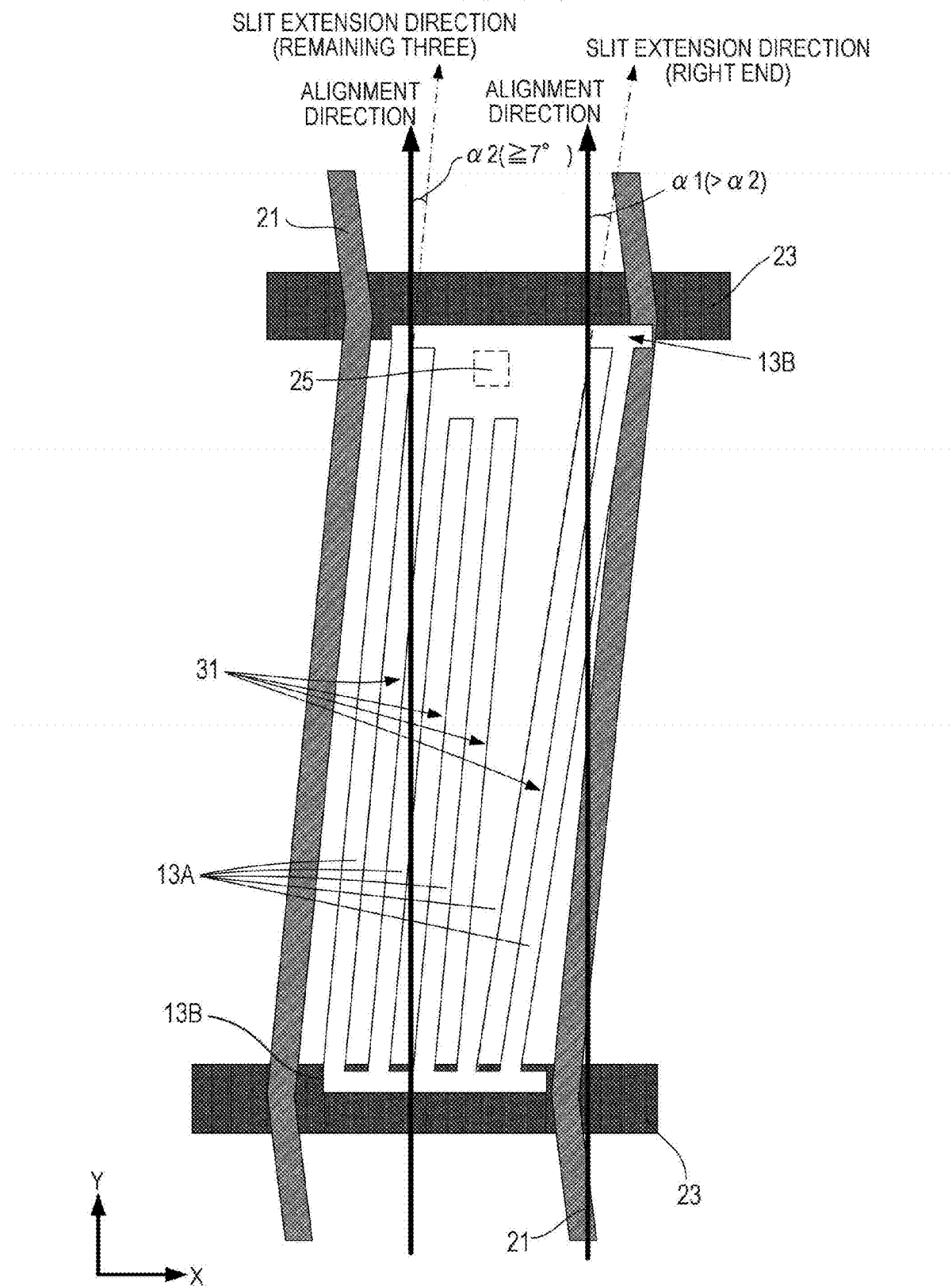
FIG. 17 is a diagram showing a fifth pixel structure example (planar structure).

FIG. 17 shows a fifth pixel structure example. This pixel structure is also used in an FFS (Fringe Field Switching) type liquid crystal panel. This pixel structure corresponds to a modification of the first pixel structure shown in FIG. 13. That is, the pixel structure of FIG. 17 corresponds to a pixel structure in which all the slits 31 are formed to have the same width. Further, the pixel structure corresponds to a pixel structure in which the cross angle $\alpha 1$ between the slit 31 formed at the right end in the drawing and the alignment direction is larger than the cross angle α2 between other three slits 31 and the alignment direction.

Meanwhile, in the fifth pixel structure, the entire pattern of the pixel electrode 13 and the signal line 21 is inclined uniformly in the pixel region such that two adjacent pixel regions above and below each scanning line 23 (in the Y-axis direction) form a vertical mirror structure with the scanning line 23 interposed therebetween. The inclination angle of the entire pattern is set so as to be inverted between the two adjacent pixel regions in the vertical direction (Y-axis direction).

For example, in the pixel region of FIG. 17, the entire pattern of the pixel electrode 13 and the signal line 21 is formed obliquely in the clockwise direction with respect to the Y-axis direction. Meanwhile, in the pixel region above or below the pixel region of FIG. 17, the pattern of the pixel electrode 13 and the signal line 21 is formed so as to be inclined in the counterclockwise direction with respect to the Y-axis direction. With the vertical mirror structure, the magnitude of the inclination angle with respect to the Y-axis direction is identical between adjacent pixel regions in the vertical direction.

Here, the pattern structure according to the pixel structure example of FIG. 17 will be described. As described above, in the pixel region of FIG. 17, the entire pixel region is inclined in the clockwise direction with respect to the Y-axis direction. Therefore, the signal line 21 and the five electrode branches 13A constituting the pixel electrode 13 are inclined in the clockwise direction with respect to the Y-axis direction.

In FIG. 17, let the cross angle between the extension direction of the slit 31 at the right end in the drawing from among the four slits 31 formed in the pixel region and the alignment direction of the liquid crystal layer 7 be α1. Further, let the cross angle between the extension direction of the three slits 31 excluding the slit 31 at the right end in the drawing from among the four slits 31 formed in the pixel region and the alignment direction of the liquid crystal layer 7 be α2.

In FIG. 17, the inclination angle of the pixel region is identical to the cross angle α2 of the slit 31. Of course, the inclination angle of the slit 31 at the right end in the drawing is larger than the inclination angle of the three slits 31 with respect to the Y-axis direction. Therefore, the relationship that the cross angle α1 is larger than the cross angle α2 is established.

In this pixel structure example, it is preferable that the cross angle α2 is set to be equal to or larger than 7°. If the cross angle α2 is set to be equal to or larger than 7°, reverse twist lines can be reliably reduced in the portion at the right end and other portions in the pixel region.

As a result, in the above-described pixel structure example, reverse twist lines which remain since the frequency of occurrence is relatively low can be eliminated from the entire pixel region. Of course, the cross angle α1 between the extension direction of the slit 31 and the alignment direction of the liquid crystal layer 7 in the portion at the right end in the pixel region where a reverse twist line conspicuously appears becomes larger than other regions. Therefore, the time until the reverse twist line disappears can be further shortened. That is, a reverse twist line which is conspicuously viewed can be eliminated in a short time, and a reverse twist line which is not easily noticeable can be eliminated a little later.

The cross angle α2 between the extension direction of the slit 31 in the central portion of the pixel region or the portion at the left end of the pixel region and the alignment direction of the liquid crystal layer 7 is equal to or larger than 7°, so the transmittance in the relevant region is lowered as compared with the above-described pixel structure example. However, even though the cross angle α2 is 10°, as described with reference to FIG. 12, the transmittance of 95% or more can be ensured. As a result, sufficient brightness and display quality can be realized.

In the pixel structure of FIG. 17, the rotation direction of the liquid crystal molecules is inverted between adjacent pixel regions. That is, while the liquid crystal molecules in one region rotate in the clockwise direction by the application of an electric field, the liquid crystal molecules in the other pixel region rotate in the counterclockwise direction by the application of an electric field. For this reason, the viewing angle dependency can be improved, and thus a liquid crystal panel with a wide viewing angle can be realized.

(H) Pixel Structure Example 6

Figure 18:
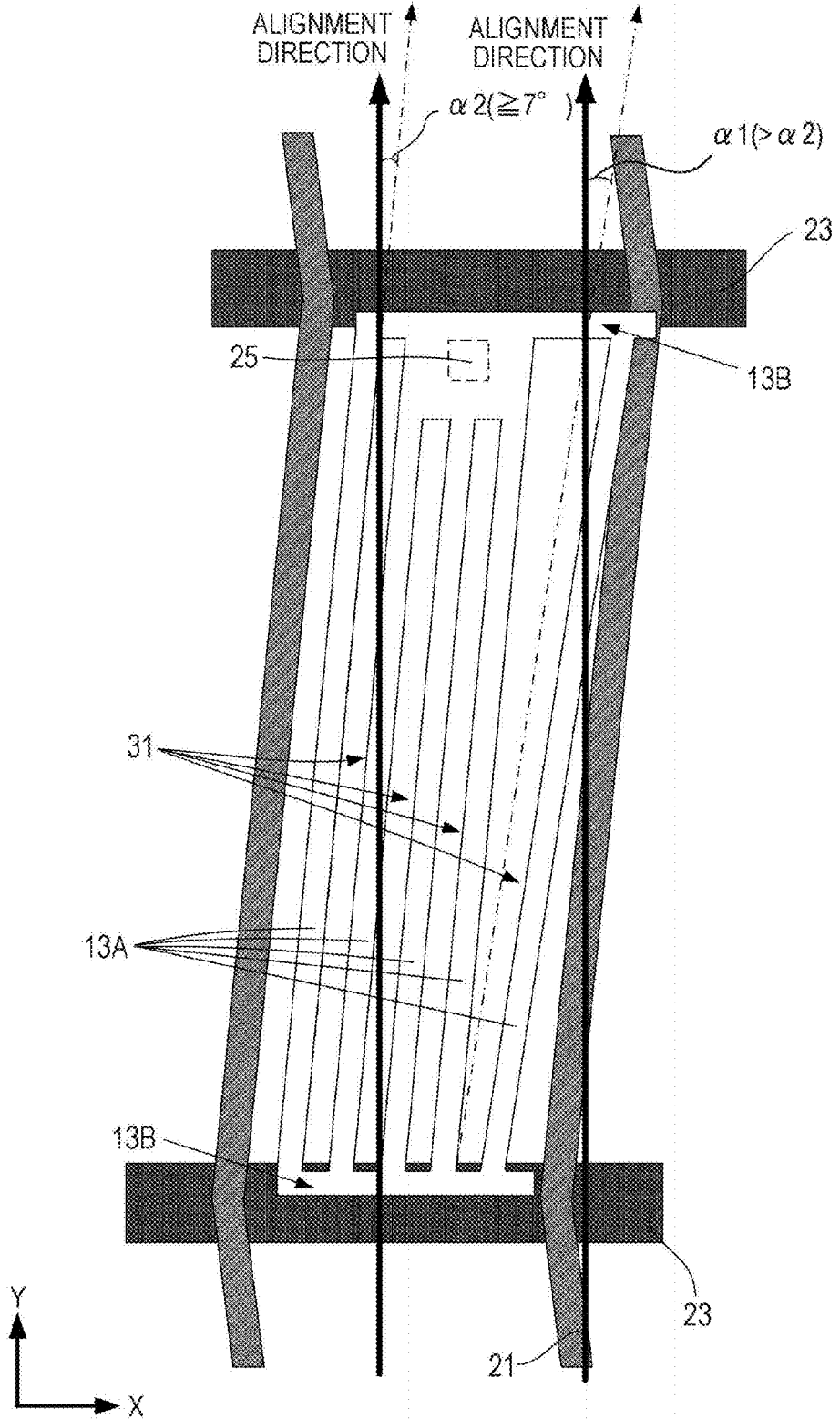
FIG. 18 is a diagram showing a sixth pixel structure example (planar structure).

FIG. 18 shows a sixth pixel structure example. This pixel structure is a modification corresponding to the fifth pixel structure example described with reference to FIG. 17.

The pixel structure of FIG. 18 is different from the pixel structure of FIG. 17 in that the shape of the slit 31 formed at the right end in the pixel region is different.

For example, in the fifth pixel structure, the four slits 31 are formed in the pixel region with the same width.

To the contrary, in the sixth pixel structure, the five electrode branches 13A are formed to have the same pattern width. For this reason, the slit 31 formed at the right end in the drawing is formed in an inverted trapezoidal shape.

In the pixel structure of FIG. 18, the extension direction of the slit formed at the right end in the drawing is identical to the extension direction of each electrode branch 13A. That is, only one slit 31 formed at the right end in the drawing is formed obliquely in the clockwise direction with respect to the signal line 21. Of course, the extension direction of other slits 31 is parallel to the signal line 21.

Therefore, in the pixel structure of FIG. 18, all reverse twist lines can be eliminated from the pixel region, and the transmittance in the entire pixel region can be maintained at a significantly high level.

Similarly to the fifth pixel structure example, the viewing angle dependency can be improved, and thus a liquid crystal panel with a wide viewing angle can be realized.

(I) Pixel Structure Example 7

Figure 19:
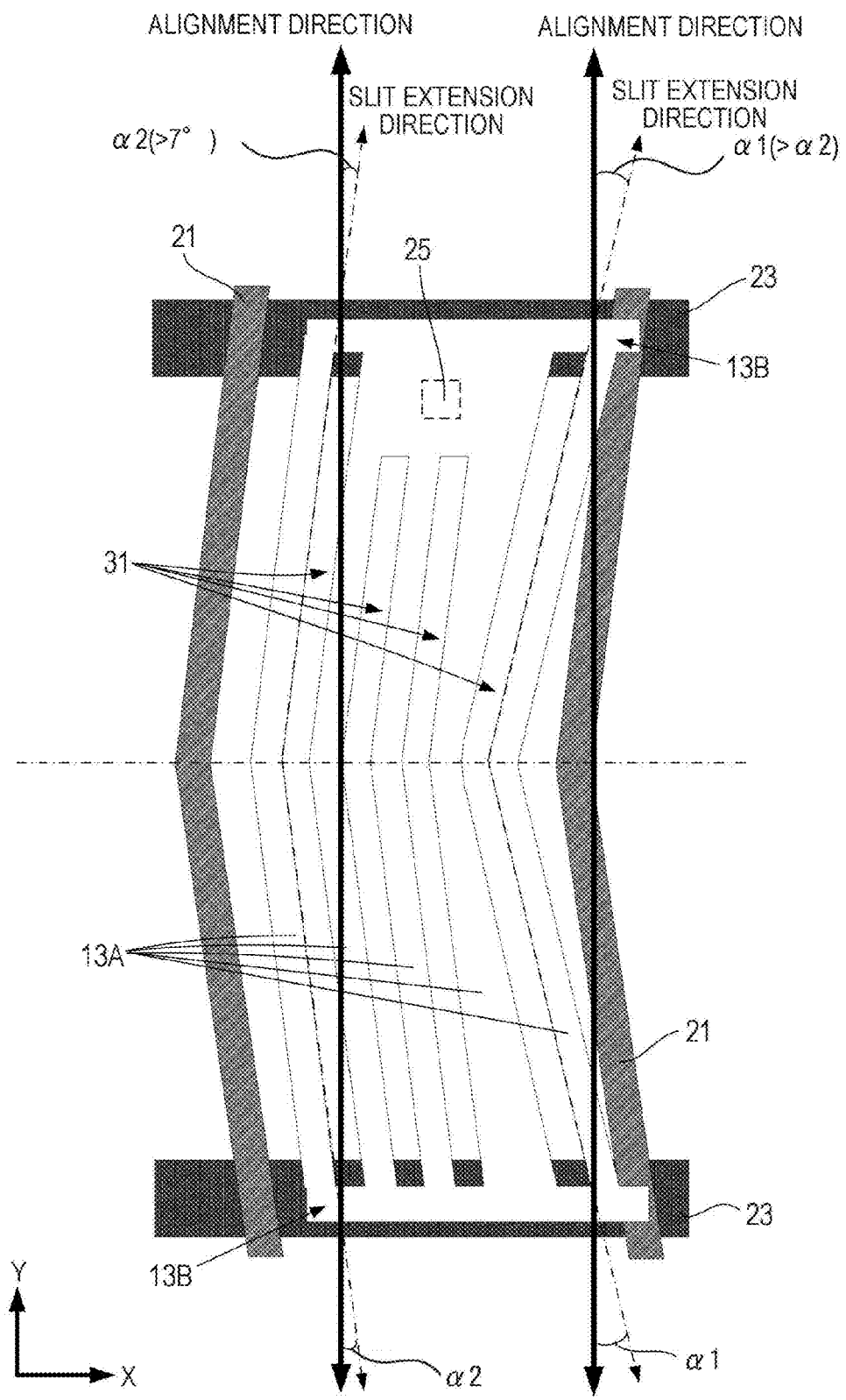
FIG. 19 is a diagram showing a seventh pixel structure example (planar structure).

FIG. 19 shows a seventh pixel structure example.

In this pixel structure example, the upper region and the lower region of one pixel region form a vertical mirror structure. For this reason, in FIG. 19, one bend point is provided around the center of the pixel region in the Y-axis direction, and the electrode branches 13A and the signal line 21 are bent.

In FIG. 19, for description of the vertical mirror structure, a virtual line extending in the X-axis direction from the bend point is shown. Of course, the basic pixel structure is the pixel structure of FIG. 17, so the cross angle α1 becomes larger than the cross angle α2. Therefore, if the cross angle α2 is set to be equal to or larger than 7°, the condition that the cross angle α1 is equal to or larger than 7° is automatically satisfied. Of course, it is preferable that only the condition the cross angle α1 is equal to or larger than 7° is satisfied, but in this case, the reverse twist lines which occur in the slits 31 other than the right end in the pixel region may not be eliminated.

In the pixel structure of FIG. 19, the rotation direction of the liquid crystal molecules is inverted between the upper half portion and the lower half portion of the pixel region. That is, while the liquid crystal molecules in the upper half portion of the pixel region in the drawing rotate in the counterclockwise direction by the application of an electric field, the liquid crystal molecules in the lower half portion of the pixel region in the drawing rotate in the clockwise direction by the application of an electric field.

As described above, the rotation direction of the liquid crystal molecules is inverted, so the amount of light per pixel can be made uniform even when the display screen is viewed at any angle. Therefore, a liquid crystal panel with a wide viewing angle can be realized.

(J) Pixel Structure Example 8

Figure 20:
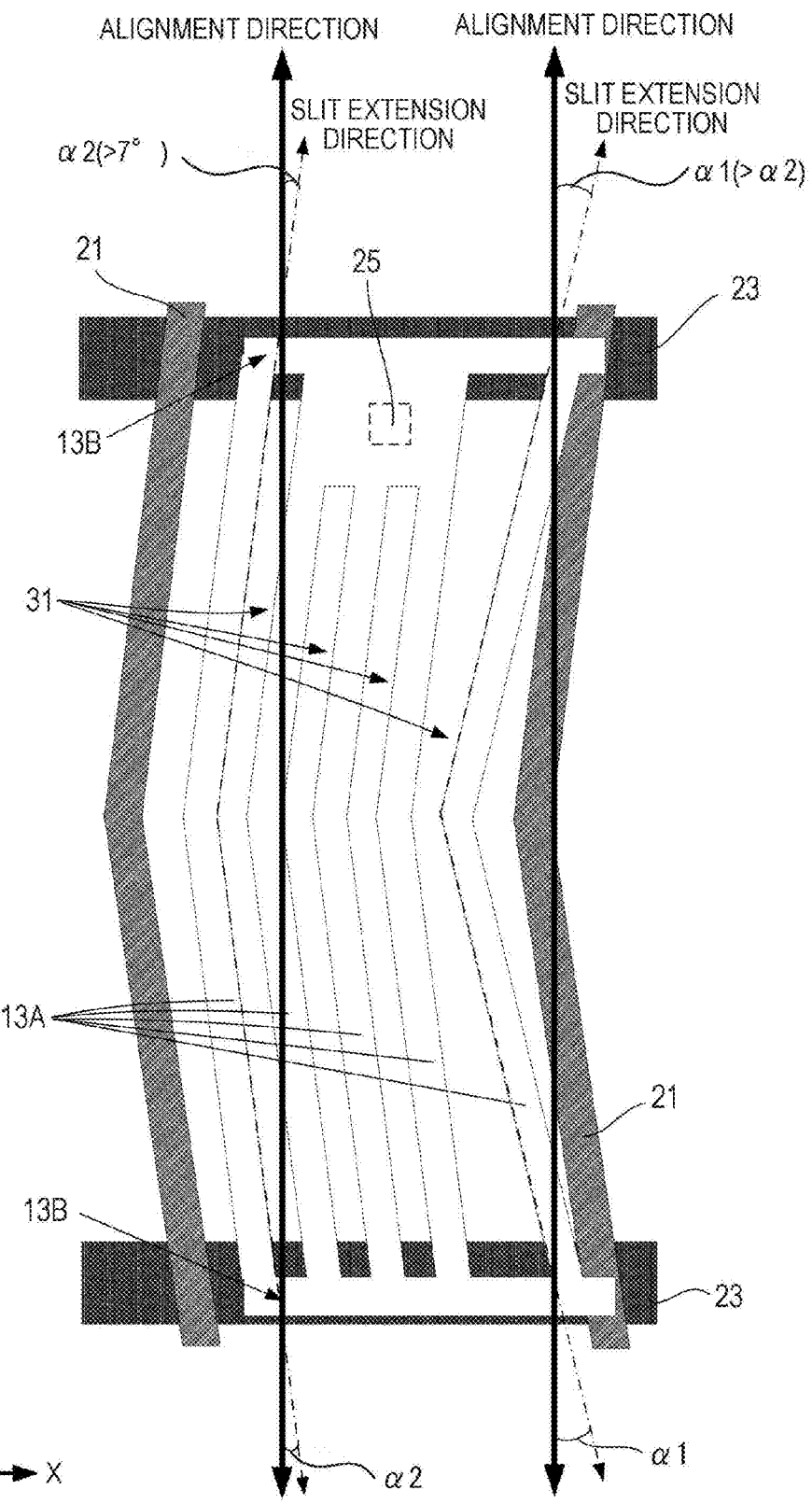
FIG. 20 is a diagram showing an eighth pixel structure example (planar structure).

FIG. 20 shows an eighth pixel structure example. This pixel structure example corresponds to a case where a dual domain structure is formed in one pixel region.

The eighth pixel structure example corresponds to a structure in which the upper region and the lower region of a pixel structure corresponding to FIG. 18 form a vertical mirror structure. That is, the eighth pixel structure example corresponds to a pixel structure example where all the five electrode branches 13A have the same pattern width.

In the eighth pixel structure example, one bend point is provided around the center of the pixel region in the Y-axis direction, and the electrode branches 13A and the signal line 21 are bent.

In FIG. 20, for description of the vertical mirror structure, a virtual line extending in the X-axis direction from the bend point is shown. Of course, the basic pixel structure is the pixel structure of FIG. 18, so the cross angle α1 becomes larger than the cross angle α2. Therefore, if the cross angle α2 is set to be equal to or larger than 7°, the condition that the cross angle α1 is equal to or larger than 7° is automatically satisfied. Of course, it is preferable that only the condition the cross angle α1 is equal to or larger than 7° is satisfied, but in this case, the reverse twist lines which occur in the slits 31 other than the right end in the pixel region may not be eliminated.

In the pixel structure of FIG. 20, the rotation direction of the liquid crystal molecules is inverted between the upper half portion and the lower half portion of the pixel region. That is, while the liquid crystal molecules in the upper half portion of the pixel region in the drawing rotate in the counterclockwise direction by the application of an electric field, the liquid crystal molecules in the lower half portion of the pixel region in the drawing rotate in the clockwise direction by the application of an electric field.

As described above, the rotation direction of the liquid crystal molecules is inverted, so the amount of light per pixel can be made uniform even when the display screen is viewed at any angle. Therefore, a liquid crystal panel with a wide viewing angle can be realized.

(K) Pixel Structure Example 9

Figure 21:
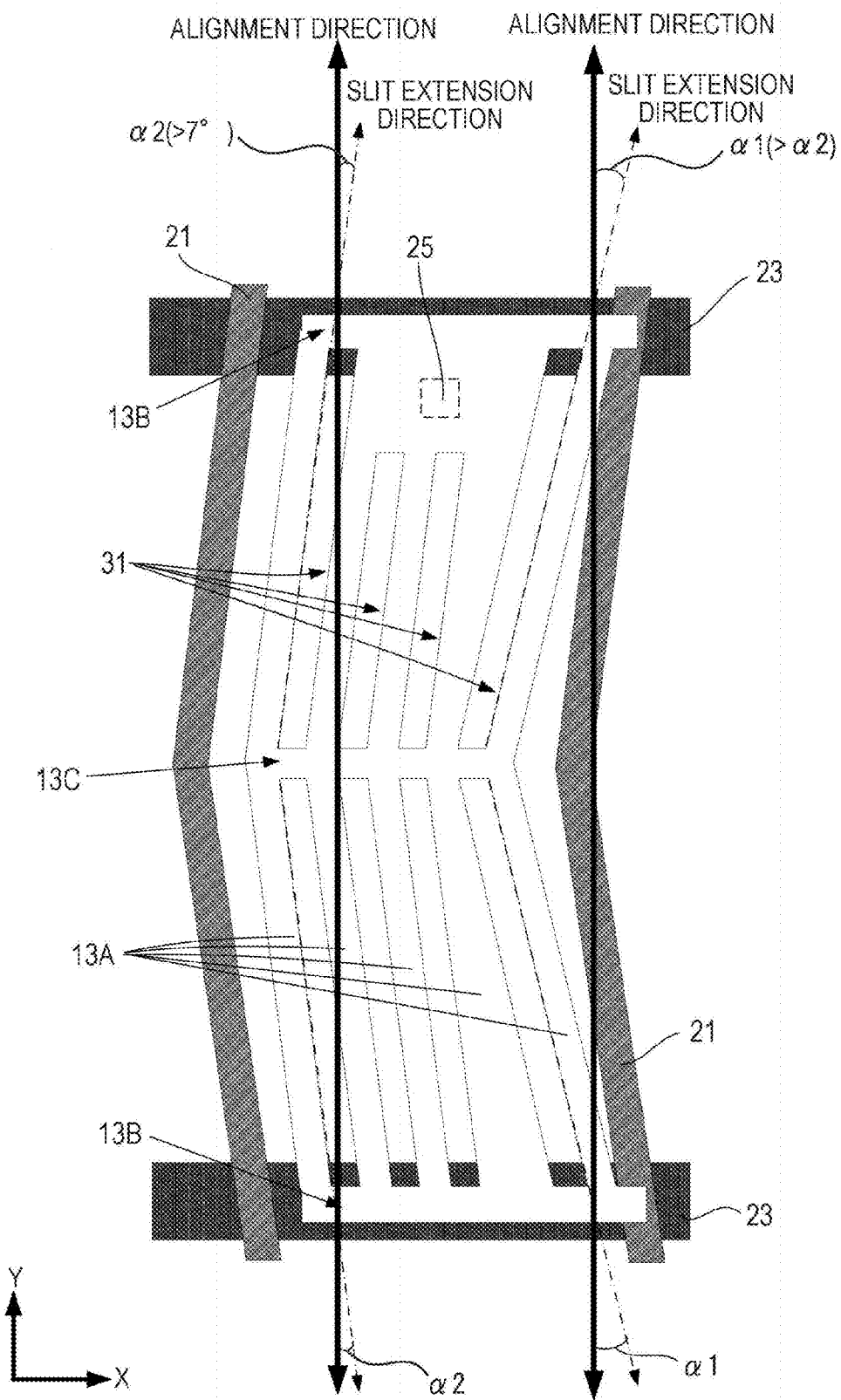
FIG. 21 is a diagram showing a ninth pixel structure example (planar structure).

FIG. 21 shows a ninth pixel structure example. A difference from FIG. 19 is that a connection branch 13C connecting the bend points of the electrode branches 13A to each other is further used.

In the pixel structure of FIG. 19, the rotation direction of the liquid crystal molecules is inverted at the boundary between the two adjacent domains in the vertical direction. For this reason, alignment disturbance inevitably occurs at the boundary, which may adversely affect the disappearance of the reverse twist line phenomenon.

Meanwhile, in the pixel structure of FIG. 21, the two domains can be completely separated from each other by the connection branch 13C. For this reason, it is possible to eliminate the arrangement disturbance of the liquid crystal molecules at the boundary between the domains. As a result, with the pixel structure shown in FIG. 21, the time until the reverse twist line phenomenon disappears can be further shortened, as compared with the pixel structure shown in FIG. 19.

(L) Pixel Structure Example 10

Figure 22:
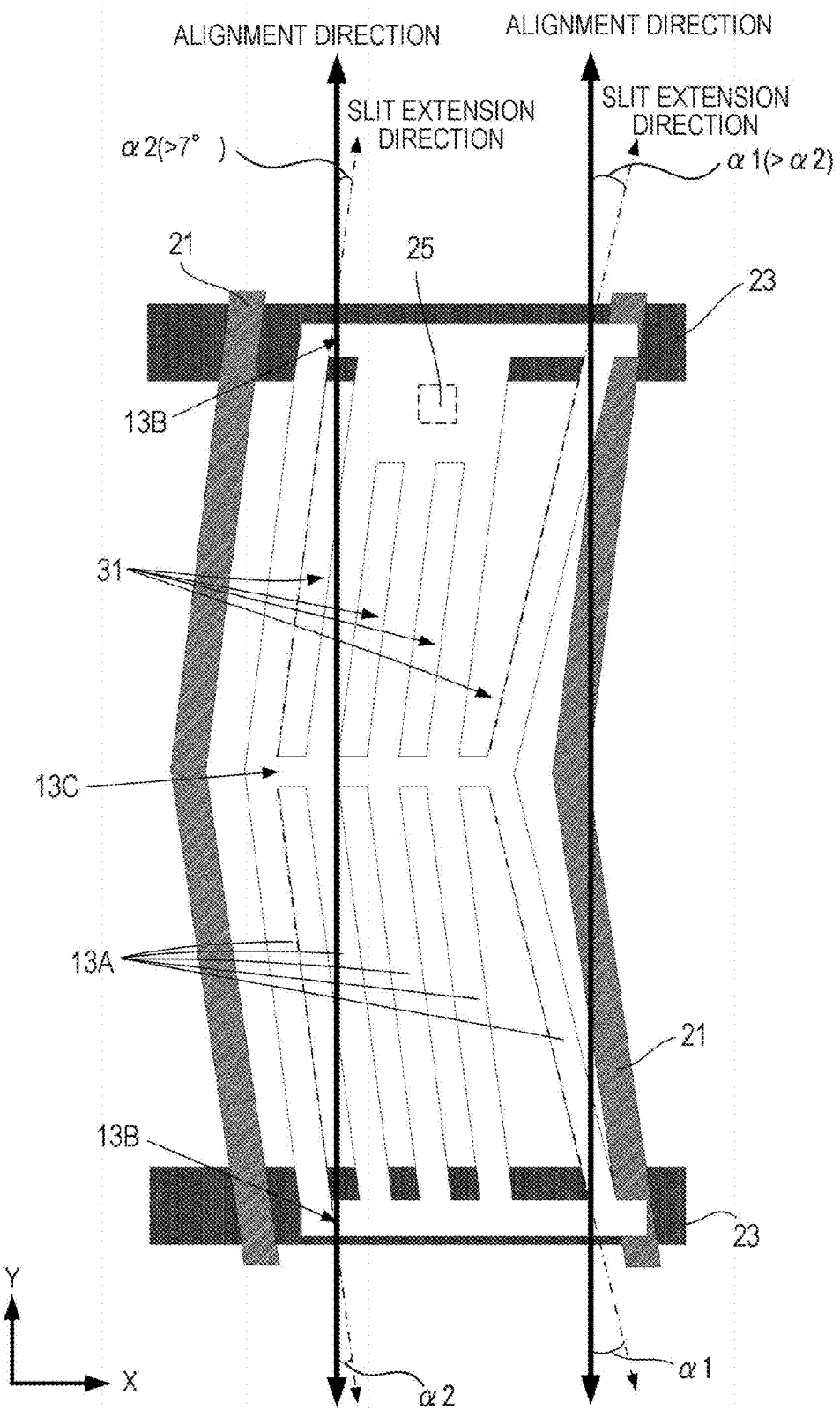
FIG. 22 is a diagram showing a tenth pixel structure example (planar structure).

FIG. 22 shows a tenth pixel structure example. The tenth pixel structure example corresponds to a modification of a dual domain structure shown in FIG. 20. That is, the tenth pixel structure example corresponds to a modification of a pixel structure in which a dual domain structure is formed in one pixel.

A difference from FIG. 20 is that a connection branch 13C connecting the bend points of the electrode branches 13A to each other is further used.

In the pixel structure of FIG. 20, the rotation direction of the liquid crystal molecules is inverted at the boundary between the two adjacent domains in the vertical direction. For this reason, alignment disturbance inevitably occurs at the boundary, which may adversely affect the disappearance of the reverse twist line phenomenon.

Meanwhile, in the pixel structure of FIG. 22, the two domains can be completely separated from each other by the connection branch 13C. For this reason, it is possible to eliminate the disturbance of the arrangement of the liquid crystal molecules at the boundary between the domains. As a result, with the pixel structure shown in FIG. 22, the time until the reverse twist line phenomenon disappears can be further shortened, as compared with the pixel structure shown in FIG. 20.

(M) Pixel Structure Example 11

In the above-described ten pixel structure examples, an FFS type liquid crystal panel having the sectional structure described with reference to FIG. 1 has been described. That is, a liquid crystal panel has been described which has the pixel structure in which the counter electrode 15 is disposed below the comb-shaped pixel electrode 13 so as to cover the entire pixel region.

Figure 23:
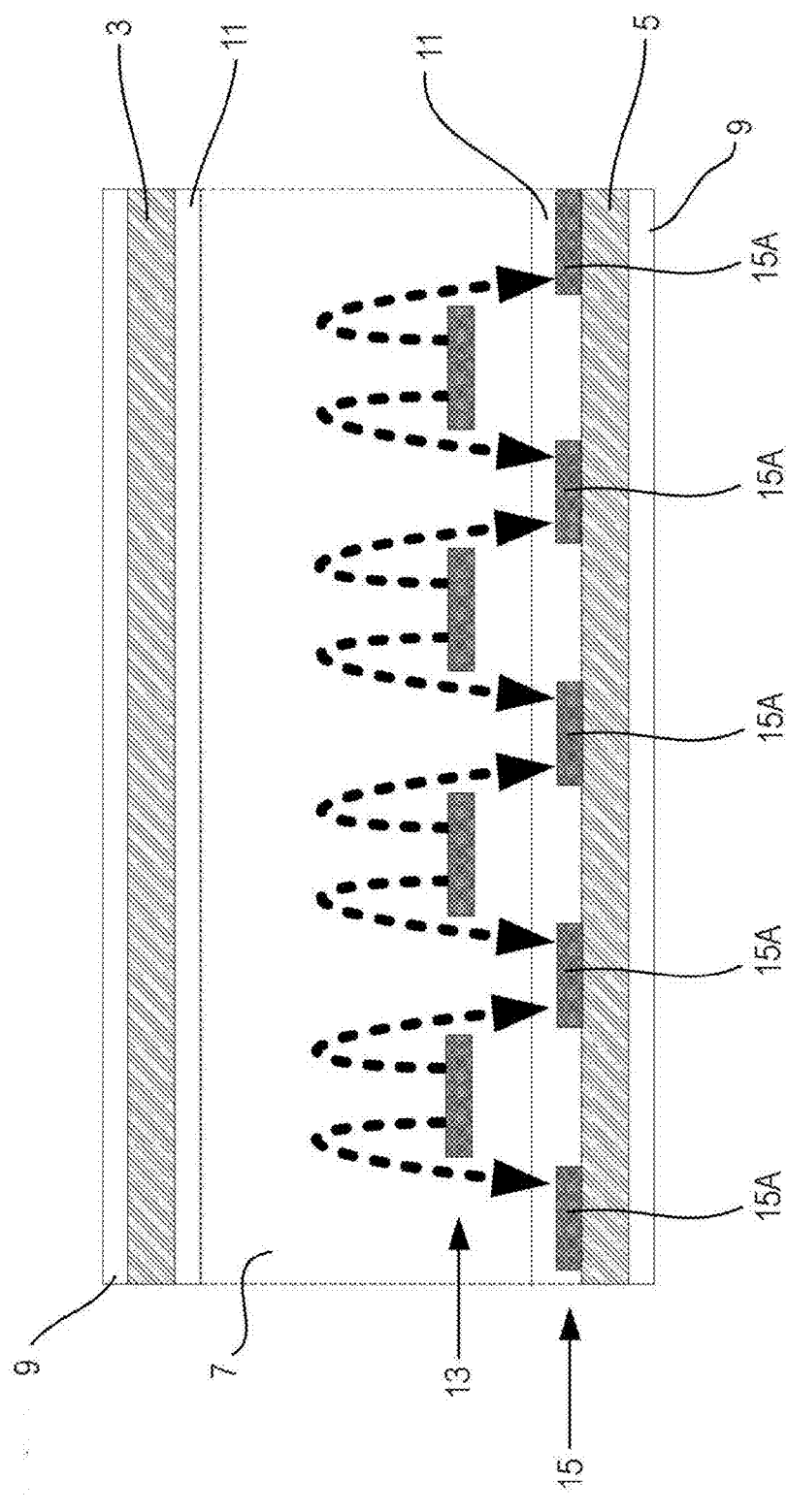
FIG. 23 is a diagram showing an eleventh pixel structure example (sectional structure).

Alternatively, as shown in FIG. 23, a liquid crystal panel may be used in which the counter electrode 15 is formed in a comb shape. In FIG. 23, the electrode branches 15A of the counter electrode 15 are disposed so as to fill the spaces (slits 31) between the electrode branches 13A of the pixel electrode 13. That is, the electrode branches 15A of the counter electrode 15 are disposed so as not to overlap the electrode branches 13A of the pixel electrode 13 in the pixel region.

(N) Pixel Structure Example 12

In the above-described pixel structure examples, the description has been made of the pixel structure in which the pixel electrode 13 and the counter electrode 15 are formed in different layers.

Alternatively, the technique which has been suggested by the inventors may be applied to a transverse electric field display type liquid crystal panel in which the pixel electrode 13 and the counter electrode 15 are formed in the same layer.

Figure 24:
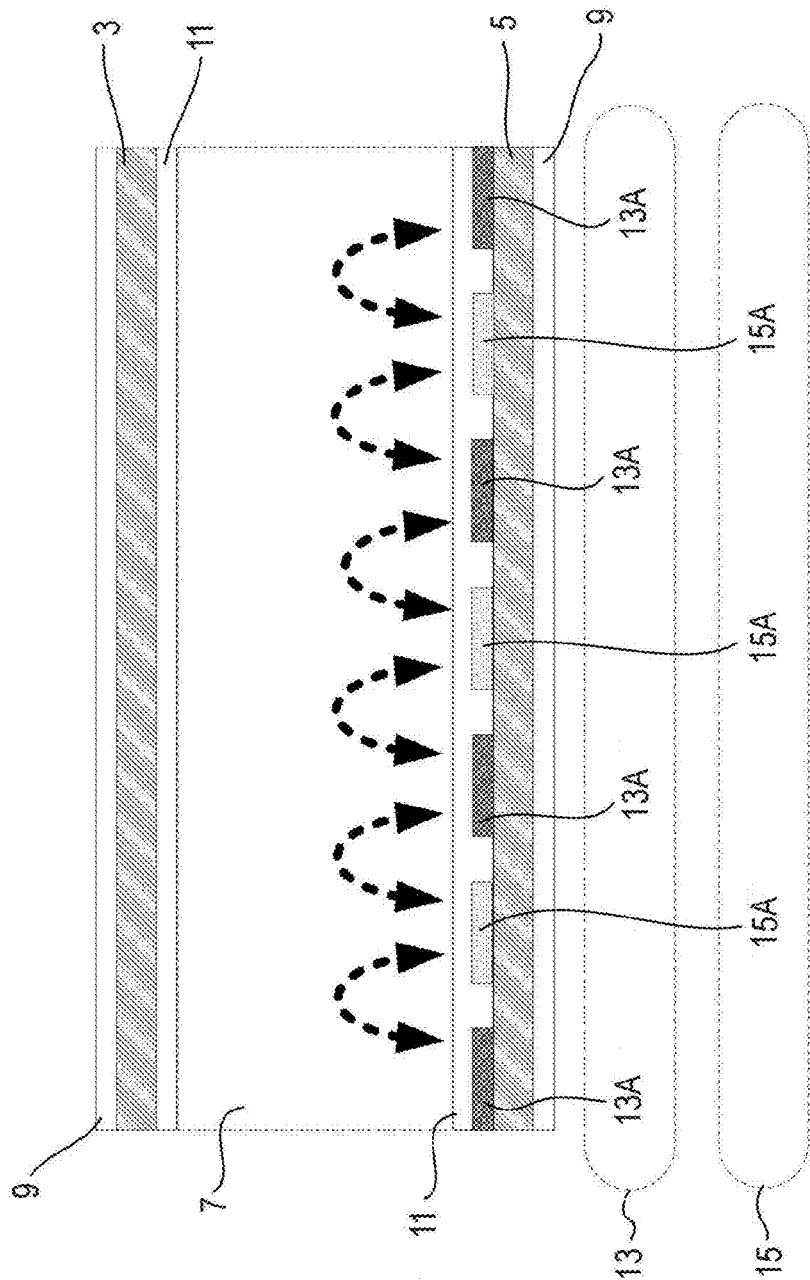
FIG. 24 is a diagram showing a twelfth pixel structure example (sectional structure).

FIG. 24 shows a sectional structure example corresponding to a twelfth pixel structure example. The structure excluding the pixel structure 13 and the counter electrode 15 is basically the same as the pixel structure described with reference to FIGS. 1 and 2.

That is, a liquid crystal panel 91 includes two glass substrates 3 and 5, and a liquid crystal layer 7 filled so as to be sandwiched with the glass substrates 3 and 5. A polarizing plate 9 is disposed on the outer surface of each substrate, and an alignment film 11 is disposed on the inner surface of each substrate.

In FIG. 24, the pixel electrode 13 and the counter electrode 15 are formed on the glass substrate 5. Of these, the pixel electrode 13 is structured such that one ends of comb-shaped four electrode branches 13A are connected to each other by a connection portion 13B. Meanwhile, the counter electrode 15 is structured such that one ends of comb-shaped three electrode branches 15A are connected to the common electrode line. In this case, the electrode branches 15A of the counter electrode 15 are disposed so as to be fitted into the spaces between the electrode branches 13A of the pixel electrode 13.

For this electrode structure, as shown in FIG. 24, the electrode branches 13A of the pixel electrode 13 and the electrode branches 15A of the counter electrode 15 are alternately disposed in the same layer. With this electrode structure, a parabolic electric field is generated between the electrode branches 13A of the pixel electrode 13 and the electrode branches 15A of the counter electrode 15. In FIG. 24, this electric field is indicated by a broken line.

(O) Pixel Structure Example 13

In the above-described twelve pixel structure examples, a case where the extension direction of each slit 31 formed by the electrode branches 13A of the pixel electrode 13 is parallel to the Y-axis direction or crosses with respect to the Y-axis direction at an acute angle (<45°) has been described.

Alternatively, the extension direction of each slit 31 formed by the electrode branches 13A of the pixel electrode 13 may be parallel to the X-axis direction or may cross with respect to the X-axis direction at an acute angle (<45°).

(P) Pixel Structure Example 14

In the above-described pixel structure examples, the slit 31 at the right end in the drawing from among the five slits 31 formed in the pixel region has been focused on, and a case where the cross angle α1 between the extension direction of the slit 31 and the alignment direction of the liquid crystal layer 7 is equal to or larger than 7° has been described.

Alternatively, the cross angle α1 between the extension direction of the two slits 31 at the left and right ends from among the five slits 31 and the alignment direction of the liquid crystal layer 7 may be set to be equal to or larger than 7°.

(Q) Other Examples (Q-1) Substrate Material
In the above description of the examples, the substrate is a glass substrate, but a plastic substrate or other substrates may be used.

(Q-2) Product Examples
In the above description, various pixel structures capable of generating a transverse electric field have been described. Hereinafter, description will be provided for electronic apparatuses in which a liquid crystal panel having the pixel structure according to the examples (with no driving circuit mounted therein) or a liquid crystal panel module (with a driving circuit mounted therein) is mounted.

Figure 25:
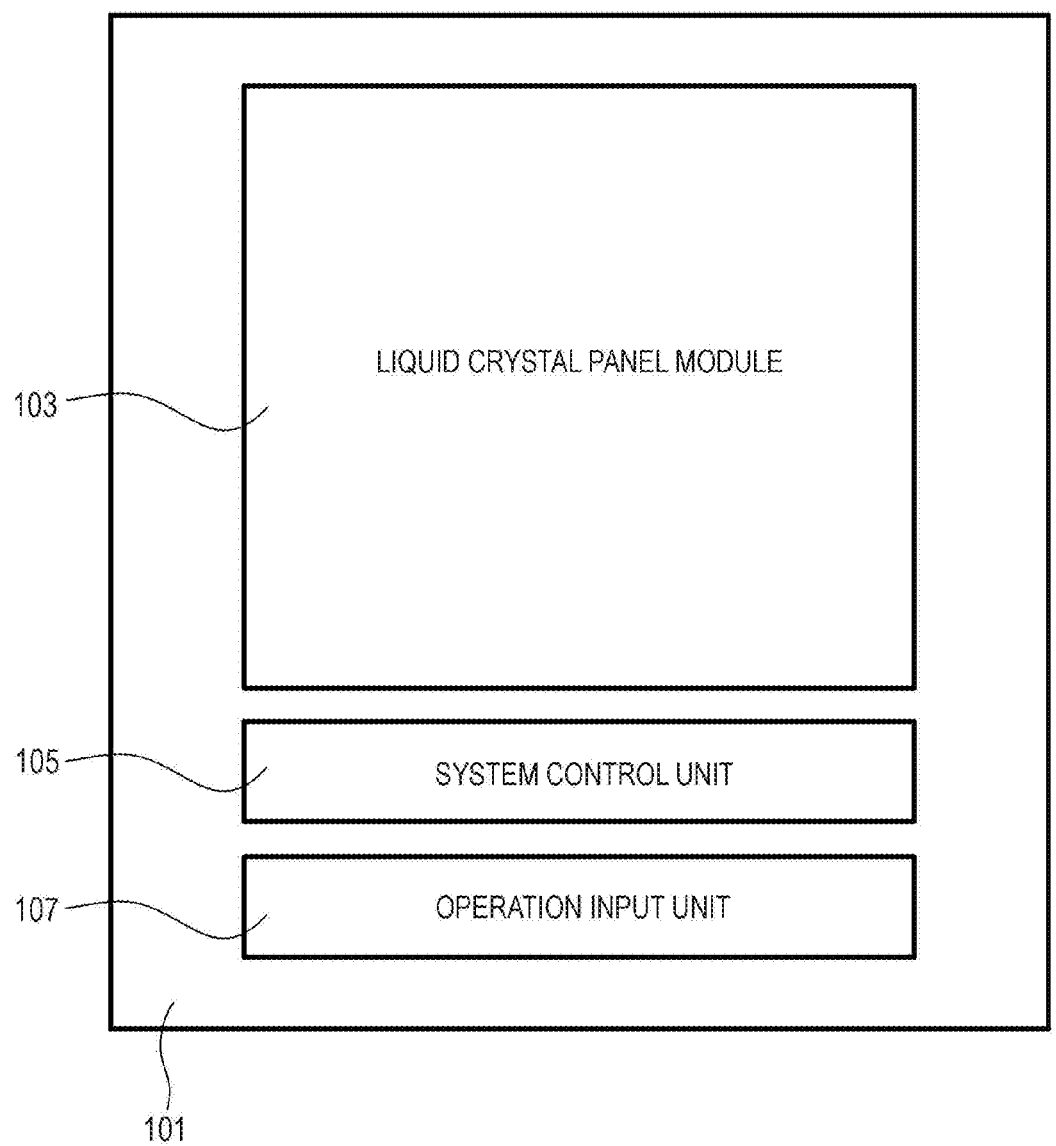
FIG. 25 is a diagram illustrating the system configuration of an electronic apparatus.

FIG. 25 shows a conceptual example of the configuration of an electronic apparatus 101. The electronic apparatus 101 includes a liquid crystal panel 103 having the above-described pixel structure, a system control unit 105, and an operation input unit 107. The nature of processing performed by the system control unit 105 varies depending on the product type of the electronic apparatus 101.

The configuration of the operation input unit 107 varies depending on the product type. A GUI (Graphic User Interface), switches, buttons, a pointing device, and other operators may be used as the operation input unit 107.

It should be noted that the electronic apparatus 101 is not limited to an apparatus designed for use in a specific field insofar as it can display an image or video generated inside or input from the outside.

Figure 26:
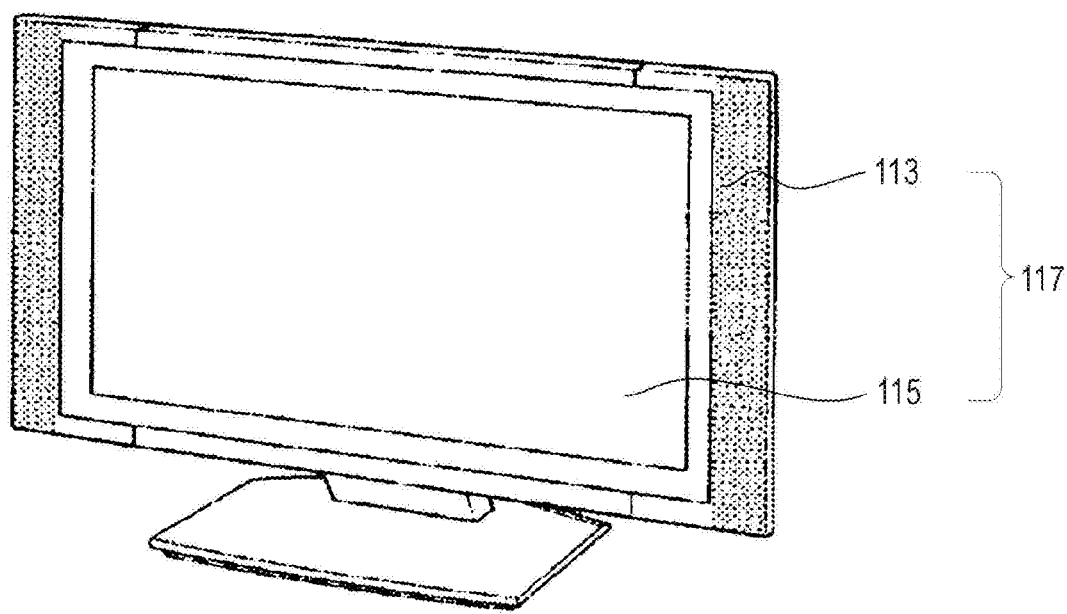
FIG. 26 is a diagram showing an appearance example of an electronic apparatus.

FIG. 26 shows an appearance example of a television receiver as an electronic apparatus. A television receiver 111 has a display screen 117 on the front surface of its housing. The display screen 117 includes a front panel 113, a filter glass 115, and the like. The display screen 117 corresponds to the liquid crystal panel according to the embodiment.

Figure 27A:
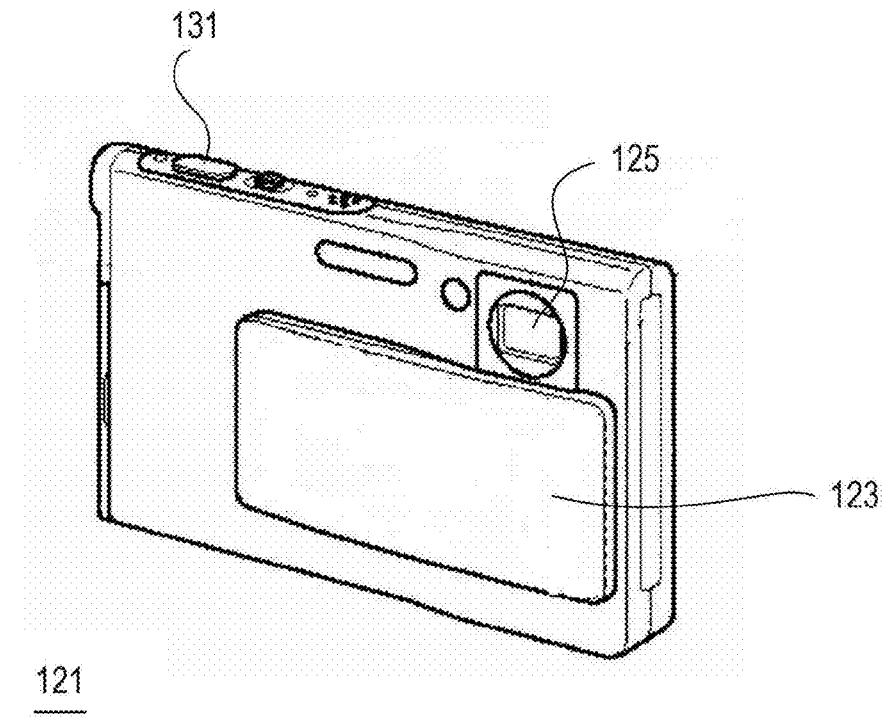
FIGS. 27A and 27B are diagrams showing an appearance example of an electronic apparatus.
Figure 27B:
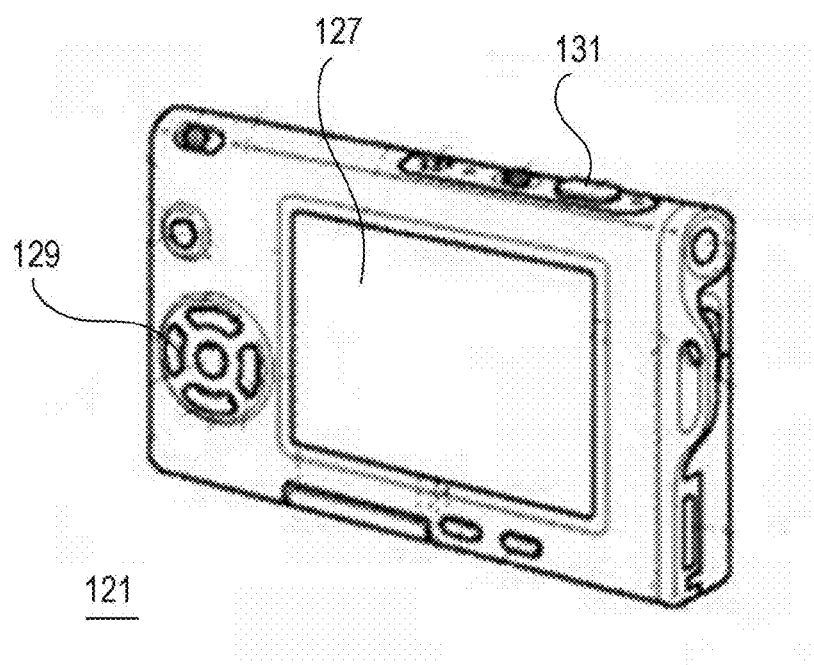

The electronic apparatus 101 may be, for example, a digital camera. FIGS. 27A and 27B show an appearance example of a digital camera 121. FIG. 27A shows an appearance example as viewed from the front (from the subject), and FIG. 27B shows an appearance example when viewed from the rear (from the photographer).

The digital camera 121 includes a protective cover 123, an imaging lens section 125, a display screen 127, a control switch 129, and a shutter button 131. Of these, the display screen 127 corresponds to the liquid crystal panel according to the embodiment.

Figure 28:
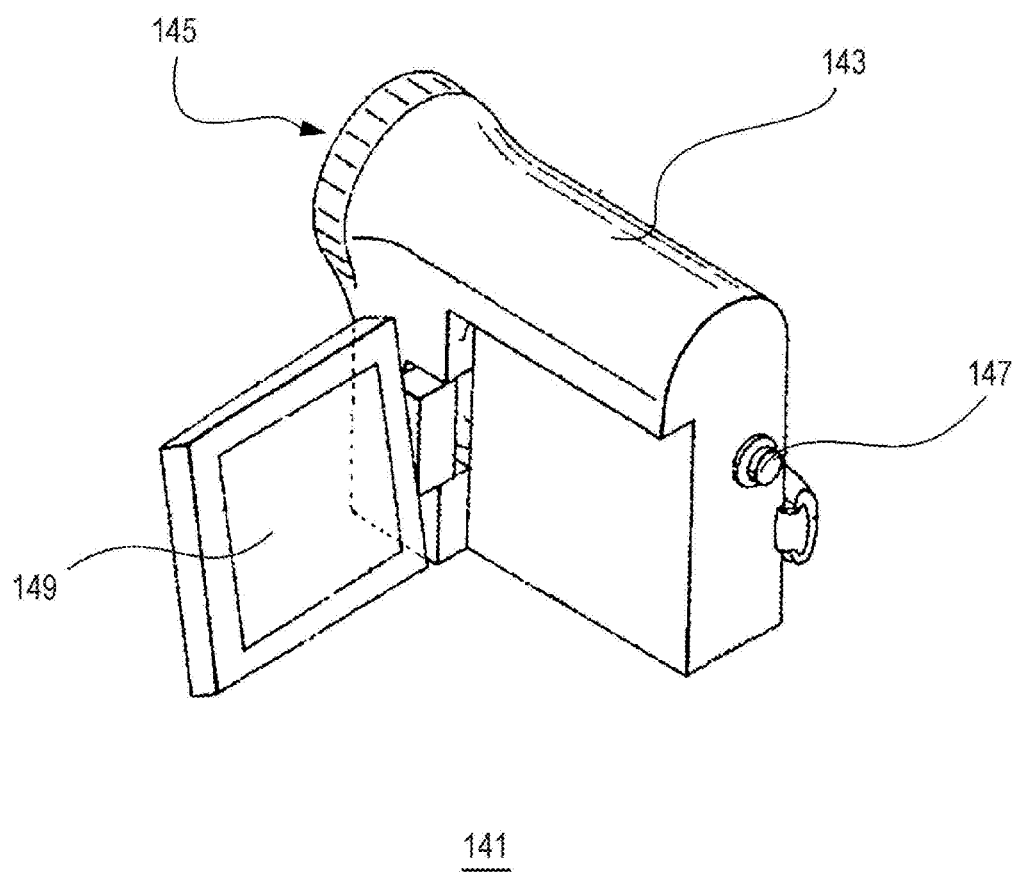
FIG. 28 is a diagram showing an appearance example of an electronic apparatus.

The electronic apparatus 101 may be, for example, a video camcorder. FIG. 28 shows an appearance example of a video camcorder 141.

The video camcorder 141 includes an imaging lens 145 provided to the front of a main body 143 so as to capture the image of the subject, a photographing start/stop switch 147, and a display screen 149. Of these, the display screen 149 corresponds to the liquid crystal panel according to the embodiment.

Figure 29A:
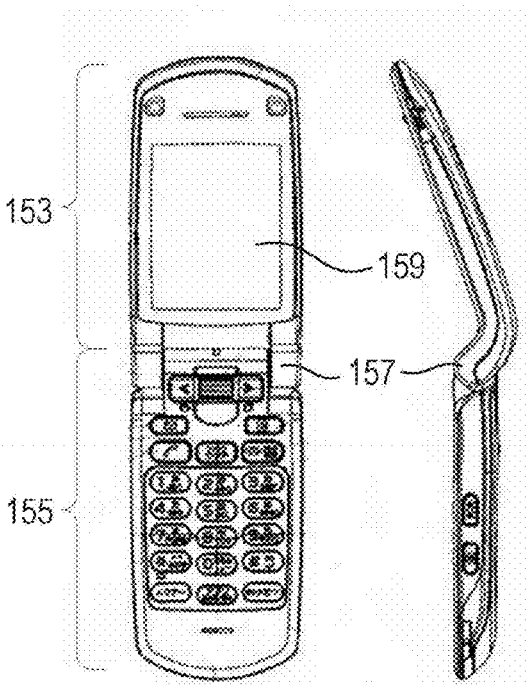
FIGS. 29A and 29B are diagrams showing an appearance example of an electronic apparatus.
Figure 29B:
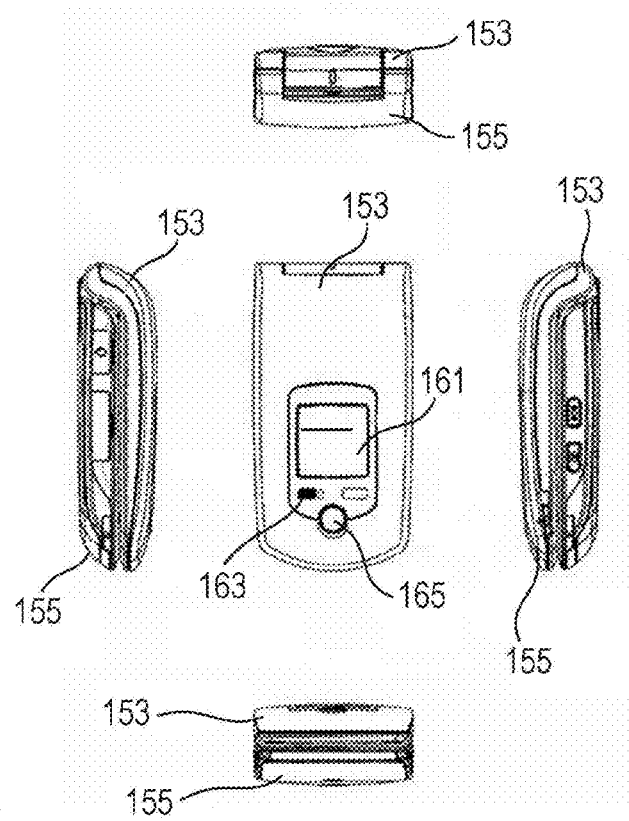

The electronic apparatus 101 may be, for example, a personal digital assistant. FIGS. 29A and 29B show an appearance example of a mobile phone 151 as a personal digital assistant. The mobile phone 151 shown in FIGS. 29A and 29B is a folder type mobile phone. FIG. 29A shows an appearance example of the mobile phone in an unfolded state, and FIG. 29B shows an appearance example of the mobile phone in a folded state.

The mobile phone 151 includes an upper housing 153, a lower housing 155, a connection portion (in this example, a hinge) 157, a display screen 159, an auxiliary display screen 161, a picture light 163, and an imaging lens 165. Of these, the display screen 159 and the auxiliary display screen 161 correspond to the liquid crystal panel according to the embodiment.

Figure 30:
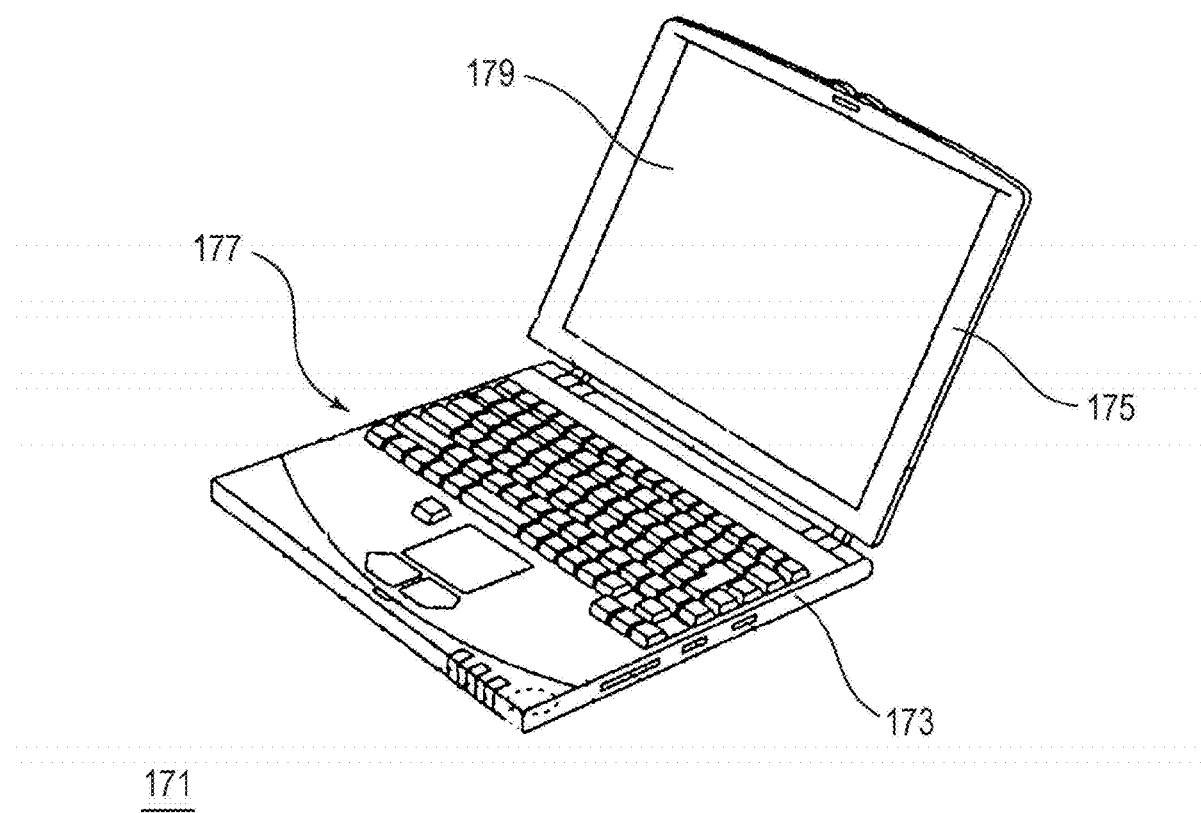
FIG. 30 is a diagram showing an appearance example of an electronic apparatus.

The electronic apparatus 101 may be, for example, a computer. FIG. 30 shows an appearance example of a notebook computer 171.

The notebook computer 171 includes a lower housing 173, an upper housing 175, a keyboard 177, and a display screen 179. Of these, the display screen 179 corresponds to the liquid crystal panel according to the embodiment.

In addition to the above-described electronic apparatuses, the electronic apparatus 101 may be, for example, a projector, an audio player, a game machine, an electronic book, an electronic dictionary, or the like.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A liquid crystal display device comprising:
   first and second substrates;
   a liquid crystal layer arranged between the first and second substrates;
   a plurality of pixel regions each surrounded by a signal line and a scanning line;
   a counter electrode arranged on the first substrate; and
   a pixel electrode arranged on the first substrate,
   wherein the pixel electrode has a plurality of electrode branches and slits formed between the electrode branches,
   wherein a first slit disposed next to the signal line has a length greater than a width, and extends in a first slit extension direction in a lengthwise direction of the first slit based on an overall shape of the first slit,
   wherein a plurality of second slits other than the first slit each have lengths greater than widths, and extend in a second slit extension direction in a lengthwise direction of the rest of the slits based on overall shapes of the second slits, the second slit extension direction being parallel to the signal line, and the second slit extension direction is at an angle relative to the first slit extension direction, and
   wherein a first cross angle ($\alpha 1$) between the first slit extension direction and an alignment direction of the liquid crystal layer is larger than a second cross angle ($\alpha 2$) between the second slit extension direction and the alignment direction of the liquid crystal layer.

2. The liquid crystal display device according to claim 1, wherein the first cross angle ($\alpha 1$) is equal to 7° or larger.

3. The liquid crystal panel according to claim 1, wherein the first cross angle ($\alpha 1$) is equal to or larger than 7° and equal to or smaller than 15°.

4. The liquid crystal panel according to claim 1, wherein the slits of the pixel electrode have the same width.

5. The liquid crystal panel according to claim 1, wherein the electrode branches of the pixel electrode have the same width.

6. The liquid crystal panel according to claim 1, wherein the pixel electrode and the counter electrode are formed on the same layer surface.

7. The liquid crystal panel according to claim 1, wherein the pixel electrode and the counter electrode are formed on different layer surfaces.

8. The liquid crystal panel according to claim 1, wherein:
   two adjacent pixel regions of the plurality of the pixel regions above and below each scanning line are arranged in linear symmetry with the scanning line, and
   the electrode branches and the slits of the pixel electrodes in the two adjacent pixel regions are alternately inclined with respect to the scanning line.

9. The liquid crystal panel according to claim 1, wherein:
   each pixel region is bent in linear symmetry at a center line of the pixel region, and
   the electrode branches and the slits of the pixel electrode in each pixel region are alternately inclined with respect to the center line of the pixel region.

10. The liquid crystal panel according to claim 1, wherein:
    each pixel region is bent in linear symmetry at a center line of the pixel region,
    the electrode branches and the slits of the pixel electrode in each pixel region are alternately inclined with respect to the center line of the pixel region, and
    a connection branch connects bent portions of the electrode branches at the center line.

\* \* \* \* \*